US008885609B2

(12) United States Patent  (10) Patent No.: US 8,885,609 B2
Nix  (45) Date of Patent: Nov. 11, 2014

(54) EFFICIENT HANDOVER OF MEDIA COMMUNICATIONS IN HETEROGENEOUS IP NETWORKS

(71) Applicant: Google Inc., Mountain View, CA (US)

(72) Inventor: John A. Nix, Evanston, IL (US)

(*) Notice: Subject to any disclaimer, the term of this patent is extended or adjusted under 35 U.S.C. 154(b) by 0 days.

(21) Appl. No.: 13/928,572

(22) Filed: Jun. 27, 2013

(65) Prior Publication Data

US 2013/0287006 A1   Oct. 31, 2013

Related U.S. Application Data

(63) Continuation of application No. 13/423,225, filed on Mar. 18, 2012, now Pat. No. 8,498,269, which is a continuation of application No. 12/120,940, filed on May 15, 2008, now Pat. No. 8,165,090.

(51) Int. Cl.
    *H04W 4/00*       (2009.01)
    *H04L 29/06*      (2006.01)
    *H04L 29/12*      (2006.01)
    *H04W 36/00*      (2009.01)
    *H04W 80/04*      (2009.01)
    *H04W 60/00*      (2009.01)

(52) U.S. Cl.
    CPC ....... *H04W 36/0011* (2013.01); *H04L 65/1093* (2013.01); *H04L 61/2564* (2013.01); *H04W 36/0022* (2013.01); *H04W 80/04* (2013.01); *H04W 60/005* (2013.01); *H04L 29/125* (2013.01)
    USPC .......................................... 370/331; 370/332

(58) Field of Classification Search
    CPC ............ H04W 36/00; H04W 36/0005; H04W 36/011
    USPC .................................................. 370/331, 332
    See application file for complete search history.

(56) References Cited

U.S. PATENT DOCUMENTS 6,768,726 B2   7/2004   Dorenbosch et al.
6,829,239 B1  12/2004   Bhatia et al.
(Continued)

FOREIGN PATENT DOCUMENTS

EP         1 811 741 A1    7/2007

OTHER PUBLICATIONS

Y. Rekhter et al, Address Allocation for Private Internets, Internet Engineering Task Force—Request for Comments: 1918, Feb. 1996, pp. 1-9.

(Continued)

*Primary Examiner* — Farah Faroul
(74) *Attorney, Agent, or Firm* — McDonnell Boehnen Hulbert & Berghoff LLP

(57) ABSTRACT

An example method may involve using a first IP:port number to receive from a second IP:port number a first media control channel stream including quality information indicative of a quality of transmission of a first media stream being sent through a network; sending from the first IP:port number to the second IP:port number a second media control channel stream including quality information indicative of a quality of transmission of a second media stream; based on a network handover request, sending from a third IP:port number to the second IP:port number a third media control channel stream including quality information indicative of a quality of transmission of a third media stream being received through an alternate network; and using the third IP:port number to receive from the second IP:port number a fourth media control channel stream including quality information indicative of a quality of transmission of a fourth media stream.

20 Claims, 15 Drawing Sheets

(56) References Cited

U.S. PATENT DOCUMENTS

| | | | |
|---|---|---|---|
| 7,953,423 B2* | 5/2011 | Gallagher et al. | 455/458 |
| 7,957,348 B1* | 6/2011 | Gallagher et al. | 370/331 |
| 8,009,612 B2* | 8/2011 | Cherian et al. | 370/328 |
| 2002/0154638 A1 | 10/2002 | Shahrier et al. | |
| 2004/0005893 A1 | 1/2004 | Isobe et al. | |
| 2004/0203785 A1 | 10/2004 | Sundquist et al. | |
| 2005/0050318 A1 | 3/2005 | Alone et al. | |
| 2005/0128979 A1 | 6/2005 | Wu et al. | |
| 2005/0286466 A1 | 12/2005 | Tagg et al. | |
| 2006/0072542 A1 | 4/2006 | Sinnreich et al. | |
| 2006/0111112 A1 | 5/2006 | Maveddat | |
| 2006/0245574 A1 | 11/2006 | Phelps et al. | |
| 2007/0070948 A1 | 3/2007 | Kezys et al. | |
| 2007/0117564 A1 | 5/2007 | Reynolds | |
| 2007/0248085 A1 | 10/2007 | Volpano | |
| 2008/0069065 A1 | 3/2008 | Wu et al. | |
| 2008/0080568 A1 | 4/2008 | Hughes et al. | |
| 2008/0176573 A1* | 7/2008 | Creamer et al. | 455/439 |
| 2008/0304458 A1* | 12/2008 | Aghvami et al. | 370/338 |
| 2011/0051682 A1* | 3/2011 | Kampmann et al. | 370/331 |
| 2011/0182243 A1* | 7/2011 | Gallagher et al. | 370/328 |
| 2012/0170574 A1* | 7/2012 | Huttunen | 370/352 |
| 2012/0177009 A1* | 7/2012 | Chang et al. | 370/331 |
| 2012/0327908 A1* | 12/2012 | Gupta et al. | 370/331 |
| 2013/0084860 A1* | 4/2013 | Wong et al. | 455/435.1 |

OTHER PUBLICATIONS

J. Rosenberg et al, SIP: Session Initiation Protocol, Internet Engineering Task Force—Request for Comments: 3261, Jun. 2002, pp. 1-264.

J. Rosenberg et al, STUN—Simple Traversal of User Datagram Protocol (UDP) Through Network Address Translators (NATs), Internet Engineering Task Force—Request for Comments: 3489, Mar. 2003, pp. 1-44.

H. Schulzrinne et al, RTP: A Transport Protocol for Real-Time Applications, Internet Engineering Task Force—Request for Comments: 3550, Jul. 2003, pp. 1-104.

C. Perkins, IP Mobility Support for IPv4, Internet Engineering Task Force—Request for Comments: 3344, Aug. 2002, pp. 1-99.

H. Izumikawa et al, SIP-based Bicasting for Seamless Handover between Heterogeneous Networks, Internet Engineering Task Force—SIPPING Working Group Draft, Feb. 2008, pp. 1-23.

Nilanjan Banerjee, Seamless SIP-Based Mobility for Multimedia Applications, IEEE Network, Mar./Apr. 2006, pp. 6-13.

Jin-Woo Jung et al, Performance Evaluation of Two Layered Mobility Management Using Mobile IP and Session Initiation Protocol, IEEE Global Telecommunications Conference-2003, Dec. 1-5, 2003 pp. 1190-1194.

Taekyoung Kwon, Network Address Translation (NAT), Seoul National University Movement Research Lab—Computer Game Course (4190.420), Fall 2006, pp. 1-60.

Rong-Hong Jan and Wen-Yueh Chiu, An Approach for Seamless Handoff Among Mobile WLAN/GPRS Integrated Networks, Computer Communications 29, Apr. 2005, pp. 32-41.

H. Tschofenig and G. Bajko, Mobile IP Interactive Connectivity Establishment (M-ICE), Internet Engineering Task Force—MIP6 Draft, Feb. 2008, pp. 1-25.

S. Salsano et al, A Solution for Vertical Handover of Multimedia Sessions Using SIP, Internet Engineering Task Force—SIPPING Working Group Draft, Aug. 27, 2007, pp. 1-24.

S. Niccolini et at, Requirements for Vertical Handover of Multimedia Sessions Using SIP, Internet Engineering Task Force—SIPPING Working Group Draft, Aug. 27, 2007, pp. 1-15.

Ling-Jyh Chen et al, Universal Seamless Handoff Architecture in Wireless Overlay Networks, UCLA Computer Science Department Technical Report CSD-TR No. 040012, 2004, pp. 1-4.

Rajiv Chakravorty et al, Performance Issues with Vertical Handovers—Experiences from GPRS Cellular and WLAN Hotspots Integration, Proceedings of the Second IEEE Annual Conference on Pervasive Computing and Communications, Mar. 14-17, 2004, pp. 155-164.

A. Dutta et al, Dynamic Buffering Control Scheme for Mobile Handoff, IEEE 17th International Symposium on Personal, Indoor and Mobile Radio Communications, Sep. 2006, pp. 1-11.

F. Chahbour et al, Fast Handoff for Hierarchical Mobile SIP Networks, Proceedings of World Academy of Science, Engineering and Technology, vol. 5 Apr. 2005, pp. 34-37.

P. Srisuresh et al, State of Peer-to-Peer (P2P) Communication Across Network Address Translators (NATs), Internet Engineering Task Force—Request for Comments: 5128, Mar. 2008, pp. 1-32.

Motorola, Technical White Paper: Long Term Evolution: A Technical Overview, 2007.

Hesham Soliman (Ed.), Mobile IPv6 Support for Dual Stack Hosts and Routers (DSMIPv6), Internet Engineering Task Force—MIP6 Working Group, Nov. 2007, pp. 1-29.

D. Johnson et al., Mobility Support in IPv6, Internet Engineering Task Force—Request for Comments: 3775, Jun. 2004, pp. 1-112.

C. Perkins et al., Mobile IPv4 Challenge/Response Extensions (Revised), Internet Engineering Task Force—Request for Comments: 4721, Jan. 2007, pp. 1-26.

Latvakoski et al., Vertical Handover During a VoIP Call in Hybrid Mobile Ad Hoc Networks, IEEE Wireless Telecommunications Symposium, Apr. 24-26, 2008, pp. 38-45.

Florian Evers and Jochen Seitz, REACH: A Roaming-Enabled Architecture for Multi-Layer Capturing, IEEE Communications Society WCNC 2008 Proceedings, 2008, 2699-2704.

Pasi Eronen, TCP Wake-Up: Reducing Keep-Alive Traffic in Mobile IPv4 and IPsec NAT Traversal, Nokia Research Center NRC-TR-2008-002, Jan. 31, 2008, pp. 1-10.

S. Sharma et al., OmniCon: A Mobile IP-Based Vertical Handoff System for Wireless LAN and GPRS Links, Computer Science Department, Stony Brook University, Unknown Date, pp. 1-10.

D. Wing, Symmetric RTP / RTP Control Protocol (RTCP), Internet Engineering Task Force—Request for Comments: 4961, Jul. 2007, pp. 1-6.

J. Rosenberg, Interactive Connectivity Establishment (ICE): A Protocol for Network Address Translator (NAT) Traversal for Offer/Answer Protocols, Internet Engineering Task Force—MMUSIC Working Group, Oct. 29, 2007, pp. 1-110.

Guest Blogger, WiFi/WiMAX Heterogeneous Seamless Handover, Intel Research, http://blogs.intel.com/research/2008/02/wifi_wimax_handover.php, Feb. 2008.

H. Schulzrinne and E. Wedlund, Application-Layer Mobility Using SIP, ACM SIGMOBILE Mobile Computing and Communications Review, Jul. 2000, pp. 47-57.

V. Gupta, IEEE 802.21 Overview of Standard for Media Independent Handover Services, IEEE 802 Plenary, San Diego, Tuesday, Jul. 18, 2006, pp. 1-65.

W. Jiang and H. Schulzrinne, Comparisons of FEC and Codec Robustness on VOIP Quality and Bandwidth Efficiency, submitted to World Scientific on Jun. 5, 2002, pp. 1-12.

Office Action mailed Jun. 2, 2011 for U.S. Appl. No. 12/163,472, 26 pages.

Office Action mailed Dec. 26, 2012 for U.S. Appl. No. 13/423,226, 25 pages.

Office Action mailed Mar. 9, 2012 for U.S. Appl. No. 12/557,617, 6 pages.

Office Action mailed Jun. 27, 2011 for U.S. Appl. No. 12/557,627, 13 pages.

Office Action mailed Feb. 24, 2012 for U.S. Appl. No. 12/557,627, 14 pages.

Office Action mailed Jul. 19, 2011 for U.S. Appl. No. 12/557,636, 19 pages.

Office Action mailed Dec. 27, 2012 for U.S. Appl. No. 12/557,636, 29 pages.

Office Action mailed Jun. 22, 2011 for U.S. Appl. No. 12/120,940, 22 pages.

Office Action mailed Dec. 20, 2012 for U.S. Appl. No. 13/423,225, 24, pages.

* cited by examiner

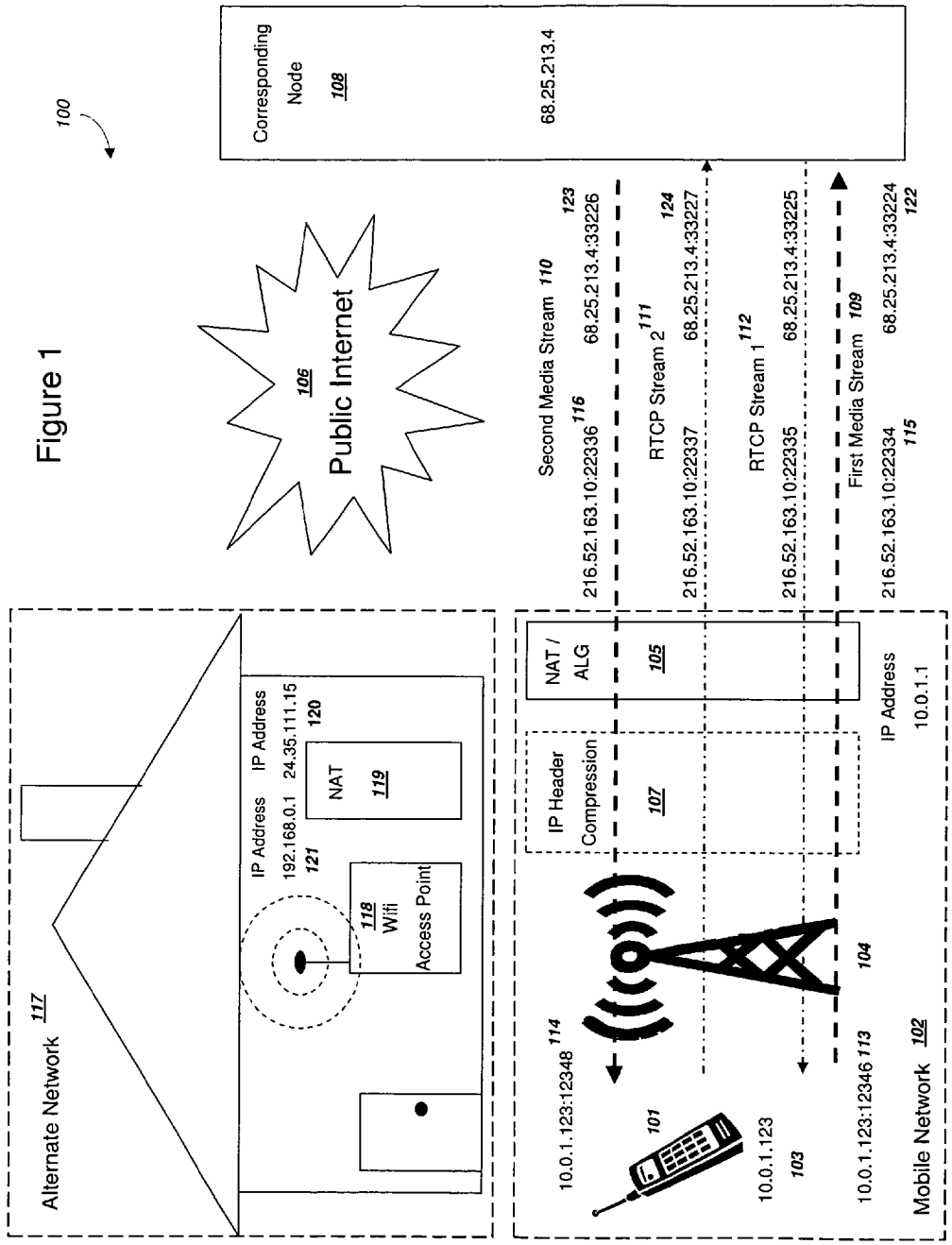

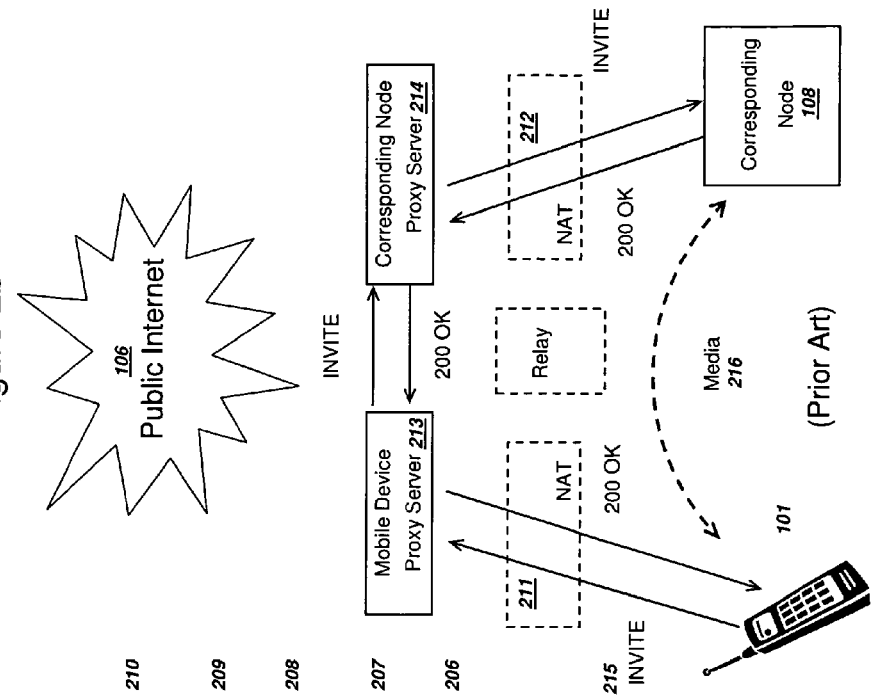
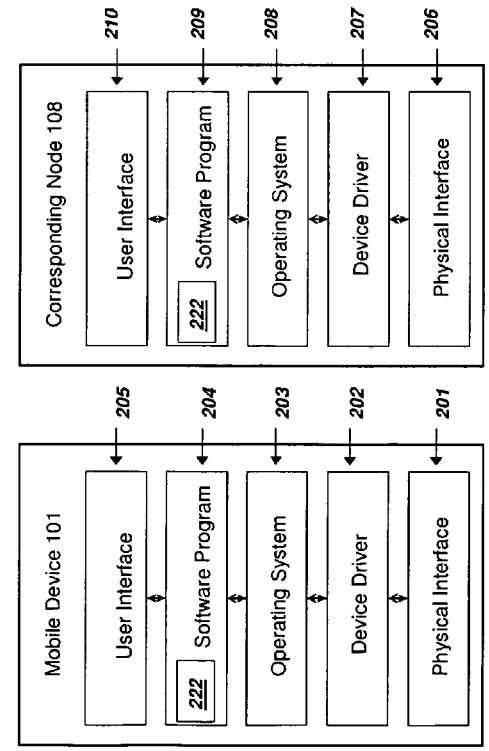
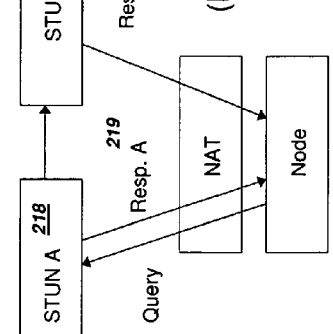

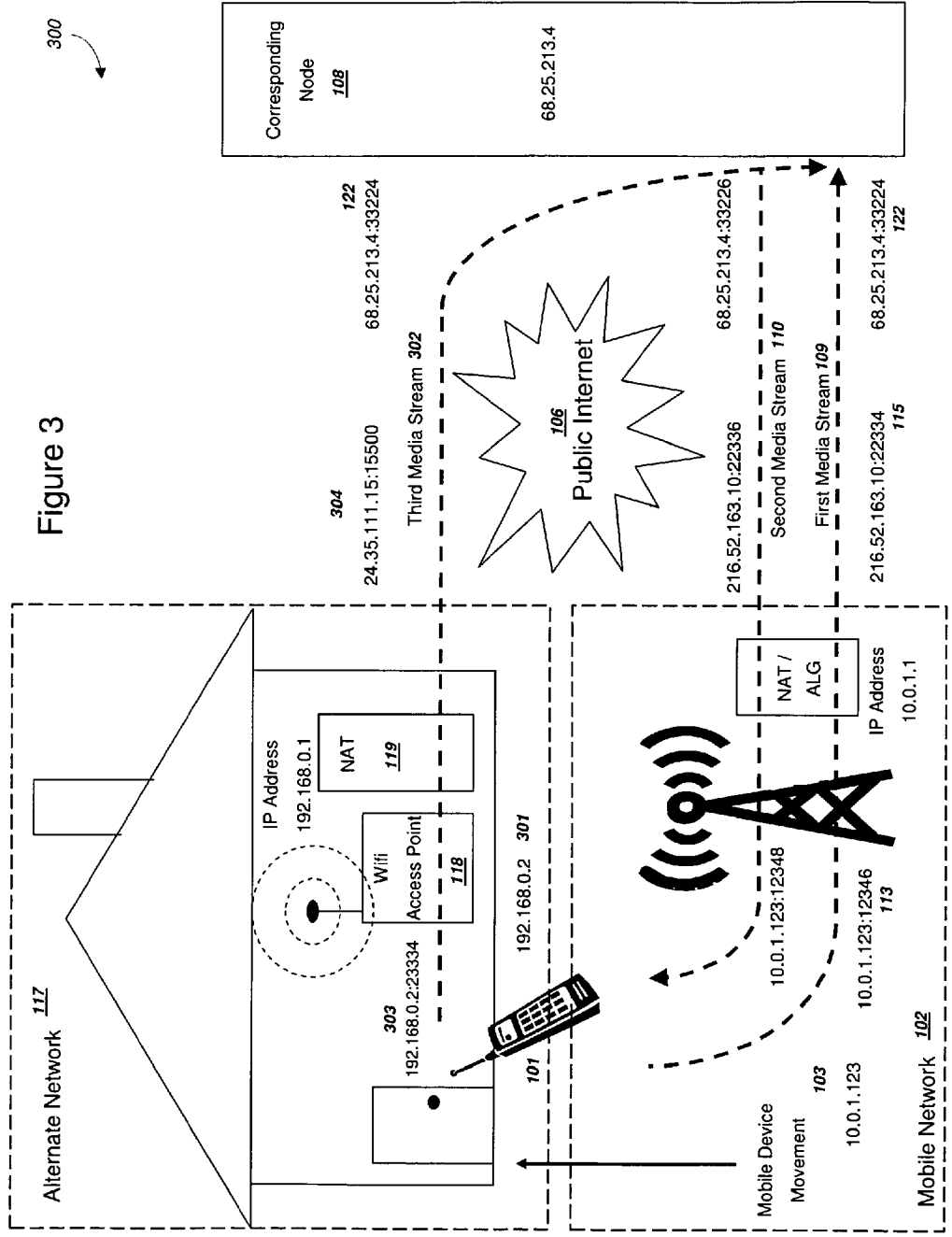

Figure 8a

| 801<br>Packet Source IP | 802<br>Packet Destination IP | 803<br>Packet Receipt Time | 804<br>Time Since Receipt of Previous Packet (ms) | 805<br>Jitter (ms) (Prior 15 packets) | 806<br>Default Jitter Buffer (ms) | 807<br>Handover Predicting Jitter Buffer (ms) |
|---|---|---|---|---|---|---|
| 68.25.213.4:33226 | 10.0.1.123:12346 | 13:23:54.245 | 15.3 | | 60 | 60 |
| 68.25.213.4:33226 | 10.0.1.123:12346 | 13:23:54.267 | 21.7 | | 60 | 60 |
| 68.25.213.4:33226 | 10.0.1.123:12346 | 13:23:54.291 | 24.0 | | 60 | 65 |
| 68.25.213.4:33226 | 10.0.1.123:12346 | 13:23:54.319 | 28.4 | | 60 | 70 |
| 68.25.213.4:33226 | 10.0.1.123:12346 | 13:23:54.336 | 16.4 | | 60 | 75 |
| 68.25.213.4:33226 | 10.0.1.123:12346 | 13:23:54.346 | 10.8 | | 60 | 80 |
| 68.25.213.4:33226 | 10.0.1.123:12346 | 13:23:54.370 | 23.6 | | 60 | 85 |
| 68.25.213.4:33226 | 10.0.1.123:12346 | 13:23:54.381 | 10.5 | | 60 | 90 |
| 68.25.213.4:33226 | 10.0.1.123:12346 | 13:23:54.408 | 27.2 | | 60 | 95 |
| 68.25.213.4:33226 | 10.0.1.123:12346 | 13:23:54.437 | 29.5 | | 60 | 100 |
| 68.25.213.4:33226 | 10.0.1.123:12346 | 13:23:54.452 | 14.8 | | 60 | 105 |
| 68.25.213.4:33226 | 10.0.1.123:12346 | 13:23:54.480 | 28.0 | | 60 | 110 |
| 68.25.213.4:33226 | 10.0.1.123:12346 | 13:23:54.505 | 25.3 | | 60 | 115 |
| 68.25.213.4:33226 | 10.0.1.123:12346 | 13:23:54.532 | 26.7 | | 60 | 120 |
| 68.25.213.4:33226 | 10.0.1.123:12346 | 13:23:54.562 | 29.9 | 6.78 | 60 | 125 |
| 68.25.213.4:33226 | 192.168.0.2:22334 | 13:23:54.668 | 106.0 | | 60 | 130 |
| 68.25.213.4:33226 | 192.168.0.2:22334 | 13:23:54.694 | 26.2 | | 80 | 125 |
| 68.25.213.4:33226 | 192.168.0.2:22334 | 13:23:54.738 | 44.2 | | 80 | 120 |
| 68.25.213.4:33226 | 192.168.0.2:22334 | 13:23:54.761 | 22.5 | | 80 | 115 |
| 68.25.213.4:33226 | 192.168.0.2:22334 | 13:23:54.804 | 42.6 | | 80 | 110 |
| 68.25.213.4:33226 | 192.168.0.2:22334 | 13:23:54.839 | 35.9 | | 80 | 105 |
| 68.25.213.4:33226 | 192.168.0.2:22334 | 13:23:54.857 | 17.4 | | 80 | 100 |
| 68.25.213.4:33226 | 192.168.0.2:22334 | 13:23:54.868 | 10.6 | | 80 | 95 |
| 68.25.213.4:33226 | 192.168.0.2:22334 | 13:23:54.912 | 44.1 | | 80 | 90 |
| 68.25.213.4:33226 | 192.168.0.2:22334 | 13:23:54.928 | 16.3 | | 80 | 85 |
| 68.25.213.4:33226 | 192.168.0.2:22334 | 13:23:54.950 | 22.1 | | 80 | 80 |
| 68.25.213.4:33226 | 192.168.0.2:22334 | 13:23:54.970 | 20.3 | | 80 | 80 |
| 68.25.213.4:33226 | 192.168.0.2:22334 | 13:23:54.981 | 10.7 | | 80 | 80 |
| 68.25.213.4:33226 | 192.168.0.2:22334 | 13:23:55.036 | 38.6 | | 80 | 80 |
| 68.25.213.4:33226 | 192.168.0.2:22334 | 13:23:55.051 | 15.8 | 12.89 | 80 | 80 |

Handover occurs at row 16 (13:23:54.668).

Figure 11

| Stream # | | At Mobile Device | | At MD NAT and CN NAT | | At Corresponding Node | |
|---|---|---|---|---|---|---|---|
| | | Source | Destination | Source | Destination | Source | Destination |
| 1 | media | 192.168.0.2:23334 | 68.25.213.4:19988 | 24.35.111.15:15550 | 68.25.213.4:19988 | 24.35.111.15:15550 | 10.20.40.22:44444 |
| | RTCP | 68.25.213.4:19989 | 192.168.0.2:23335 | 68.25.213.4:19989 | 24.35.111.15:15555 | 10.20.40.22:44445 | 24.35.111.15:15555 |
| 2 | media | 68.25.213.4:19988 | 192.168.0.2:23334 | 68.25.213.4:19988 | 24.35.111.15:15550 | 10.20.40.22:44444 | 24.35.111.15:15550 |
| | RTCP | 192.168.0.2:23335 | 68.25.213.4:19989 | 24.35.111.15:15555 | 68.25.213.4:19989 | 24.35.111.15:15555 | 10.20.40.22:44445 |
| 3 | media | 10.0.1.123:12346 | 68.25.213.4:19988 | 216.52.163.10:22334 | 68.25.213.4:19988 | 216.52.163.10:22334 | 10.20.40.22:44444 |
| | RTCP | 68.25.213.4:19989 | 10.0.1.123:12347 | 68.25.213.4:19989 | 216.52.163.10:22344 | 10.20.40.22:44445 | 216.52.163.10:22344 |
| 4 | media | 68.25.213.4:19988 | 10.0.1.123:12346 | 68.25.213.4:19988 | 216.52.163.10:22334 | 10.20.40.22:44444 | 216.52.163.10:22334 |
| | RTCP | 10.0.1.123:12347 | 68.25.213.4:19989 | 216.52.163.10:22344 | 68.25.213.4:19989 | 216.52.163.10:22344 | 10.20.40.22:44445 |

EFFICIENT HANDOVER OF MEDIA COMMUNICATIONS IN HETEROGENEOUS IP NETWORKS

CROSS REFERENCE TO RELATED APPLICATION

The present application is a continuation of U.S. patent application Ser. No. 13/423,225, filed on Mar. 18, 2012, and entitled "Efficient Handover of Media Communications in Heterogeneous IP Networks," which is a continuation of U.S. patent application Ser. No. 12/120,940 (now U.S. Pat. No. 8,165,090), filed on May 15, 2008, and entitled "Efficient Handover of Media Communications in Heterogeneous IP Networks," all of which are herein incorporated by reference as if fully set forth in this description.

BACKGROUND

1. Technical Field

The present methods and systems relate to media communications such as voice or video over packet-switched networks and, more particularly, to efficient methods and systems for handover of active media sessions when mobile devices move between heterogeneous Internet Protocol (IP) networks.

2. Description of Related Art

The use of public packet-switched networks for voice and video communications is expected to continue to rapidly grow. "Internet telephony" is one example of packet-switched telephony. In packet-switched telephony, a packet-switched network such as the Internet serves as a transportation medium for packets carrying data for voice, video, or other media such as music. Voice-over-Internet-Protocol (VoIP) is one example of a collection of standards and protocols used to support voice or video communications over packet-switched networks such as the Internet. Others have been developed as well, including proprietary protocols such as Skype®. A common Internet-telephony scheme involves a computer or other device that is capable of connecting to the Internet, transmitting voice or video to a second device such as a gateway, another mobile device, or another computer.

A long-term, planned evolution of existing mobile networks worldwide is to migrate the underlying mobile network protocols and systems from a traditional circuit-switched architecture for voice services to a packet-switched architecture that is based on IP standards. Prominent examples include the 3GPP (3rd Generation Partnership Project) consortium's announced "Long-Term Evolution" (LTE) standards as well as the Institute of Electrical and Electronic Engineers' (IEEE) mobile WiMax standards (802.16 or 802.20) and subsequent versions. Although these standards continue to evolve, a common expected feature is that the underlying networks will remain packet switched and based on IP standards such as IPv4 and IPv6. With these next-generation networks, voice, video, or other media is transmitted over the IP network provided by the mobile operator or wireless Internet Service Provider (ISP). Media sessions such as voice calls can be managed by protocols such as the Session Initiation Protocol (SIP), and these protocols generally operate at the application layer of the Open Systems Interconnection (OSI) stack. The IP Multimedia Subsystem (IMS) as specified by 3GPP is another example of next-generation mobile-network technology that implements voice calls via application-layer software to manage media sessions.

Numerous benefits may be realized through the use of packet-switched telephony based on IP standards for mobile networks. First, mobile operators would like to provide access data services such as web-browsing, e-mail, or video through the mobile device, and these services are frequently provided through standard Internet protocols such as Hypertext Transfer Protocol (HTTP) for web browsing, Simple Mail Transfer Protocol (SMTP) for e-mail, or Real-Time Streaming Protocol (RTSP) for video. Thus, mobile network operators may efficiently support many data services through the deployment of an IP network and by assigning IP addresses to mobile devices. With an efficient IP network, the traditional circuit-switched network becomes redundant, and the mobile operator can lower costs and simplify operations by managing a single IP network instead of both an IP network and a circuit-switched network.

Further, voice services worldwide are migrating to IP networks, and the International Telecommunications Union (ITU) projected that nearly 50% of all international phone calls were carried by VoIP in 2007. As the corresponding endpoints for telephone calls or media sessions are increasingly located on IP networks, the most efficient method for connecting calls should be to keep the call control and media on the Internet when possible, as opposed to (i) transferring calls to a circuit-switched network such as the traditional Public Switched Telephone Network (PSTN) and then (ii) transferring the call back to the Internet in order to reach another endpoint that is also connected to the Internet. Also, keeping the VoIP telephone calls from mobile devices natively on the Internet can reduce costs, since traditional per-minute charges for connecting phone calls with the legacy PSTN can be bypassed.

Although the implementation of an underlying IP network for all mobile services provides the significant benefits noted above, several important new challenges are created. An important class of problems relates to handover of active media sessions such as voice calls when the mobile device moves through the mobile network or between different networks. A significant focus of the various wireless Wide Area Network (WAN) standards such as 802.11e and 802.20 pertains to keeping an IP address bound to the mobile device or Media Access Control (MAC) address, even if the mobile device changes base stations due to movement such as driving in a car.

Traditional VoIP protocols such as SIP, Extensible Messaging and Presence Protocol (XMPP), H.323, Media Gateway Control Protocol (MCGP), or Inter-Asterisk Exchange (IAX2), as well as current implementations of proprietary protocols such as Skype®, were originally designed when almost all devices with IP addresses could reasonably be expected to keep the same IP address for the duration of a media session. Further, active sessions in many applications that implement transmission control protocol (TCP) were also not designed for the IP address to change during the session, such as Secure Shell (SSH) or File Transfer Protocol (FTP). Consequently, mobile operators and users may prefer for the IP address of the mobile device to not change during active sessions, and next generation mobile networks using protocols such as WiMax and LTE are generally designed to minimize the change of IP addresses assigned to a given device.

For voice services, changing the IP address during an active call can result in noticeable gaps or delay in the audio for both sides, especially when the IP address is changed as the subscriber moves between completely different networks, such as from a macro-cellular WiMax network to a WiFi (802.11) network in a building. Such a change in IP addresses for the mobile device could be a likely scenario when the subscriber walks into an office building from the street, for example, where a superior connection to the Internet is provided through a local WiFi connection instead of a wide area WiMax connection.

What is needed in the art are techniques for seamless handover of the active telephone call when the preferred IP address of the mobile device changes, such that potential gaps or distortion of audio are minimized, in order to efficiently maintain "peer-to-peer" communication with a corresponding node. What is also needed in the art is the avoidance of a disconnected call upon an IP address change, which would require the user to place a second call to continue the conversation. When the Internet connectivity for the example WiFi network is provided by an ISP that is a different entity from the mobile operator, the two subnets of the public Internet are commonly referred to as "heterogeneous" networks, in that they may be separately-managed subnets of the public Internet.

Under the above scenario of handing over an active media session such as a voice call when a mobile device acquires a new preferred IP address for communication, a need in the art exists to solve the significant class of problems introduced by various types of proxy servers, firewalls, and application-layer gateways that may operate on the Internet between a mobile device and a corresponding node. The handover of an active call between heterogeneous networks is also referred to as "vertical handover". For example, an Application Layer Gateway (ALG), managed by the mobile operator, located between the mobile network and the public Internet may both (i) compress IP headers and also (ii) perform firewall functions, but an ALG may not be present when the mobile device connects to the Internet via WiFi.

Although applications such as VoIP or web browsing operating on a mobile device may prefer to keep the same IP address active during a session under normal circumstances, there are many instances when routing the packets through a new or different IP address on the mobile device (MD) may be preferred in order to provide the superior service to the subscriber. A mobile device that provides services through Internet protocols will generally prefer a link-layer connection that provides higher signal-to-noise ratios, lower power requirements, lower costs for the IP connectivity, and/or other benefits. When the mobile device is in the proximity of an 802.11 access point, connecting to the Internet through the 802.11 access point instead of the macro-cellular network may be preferred.

In addition, WiFi technology is currently widely deployed, and the number of access points globally is expected to continue to increase. For example, the market research firm In-Stat estimated 213 million Wi-Fi chipsets shipped out worldwide in 2006, representing a 32% growth rate over 2005. When (i) a subscriber places a telephone call on a mobile device that connects to the Internet through WiFi, such as at the subscriber's home or office, and then (ii) the subscriber moves out of WiFi range by leaving the premises, and the macro-cellular network begins providing IP connectivity, the underlying IP address of the mobile device will likely change. There could also likely be a period of time when both the IP address from the WiFi network and the IP address from the wireless wide area network (WAN) are available and active.

Similarly, superior connectivity to the mobile device may be delivered by changing from the macro-cellular network to WiFi. For example, if a macro-cellular WiMax network is provided through the 2.50-2.69 GHz frequency bands identified in the ITU WRC-2000 recommendations, the macro-cellular network signal may be degraded by building walls, and an improved connection for the device could be obtained by switching the IP connectivity for the mobile device from the macro-cellular network to WiFi when a subscriber walks inside a building with WiFi access. In some instances, the quality of the macro-cellular connection could degrade to the point where it is unusable while WiFi connectivity is strong, such as if the subscriber moves into the basement of a building in close proximity to a WiFi base station. In this example scenario, there exists a need in the art to change the IP address that the mobile device utilizes for communicating with a corresponding node as rapidly as possible through minimizing requirements for call-control signaling, as the preferred routing of both inbound and outbound packets is changed from the macro network to WiFi.

There may be a period of time when both IP addresses are active and available to applications simultaneously on the mobile device, and a need exists in the art to support "make before break" handover. There exists a need in the art to support handover between WiFi and macro-cellular networks that implement VoIP for telephone calls in order to provide significant benefits to the mobile operator and subscriber through increased network coverage. There is also a need in the art for efficient handover techniques that will reduce the potential for dropped media packets or increased jitter in a manner that requires minimal additional servers or processes for the mobile network or communications service provider to manage. A need exists in the art to perform the handover in a rapid manner.

The IP address of the mobile device may also change when the subscriber moves between separate mobile operator networks that both provide IP connectivity, analogous to roaming in traditional 2G and 3G mobile networks. A need exists in the art to properly execute the handover when the preferred IP address changes, thus allowing an "all IP" network infrastructure to keep active telephone calls from being disconnected, even though the subscriber moves between completely-separate networks. In legacy mobile networks such as those with GSM 2G technology, a subscriber's telephone call will generally not remain active if, for example, a T-Mobile® subscriber moves from a location serviced by T-Mobile® to a location serviced by AT&T® (and not by T-Mobile®), even though AT&T® and T-Mobile® may have roaming agreements that allow idle handovers.

The handover of active calls between heterogeneous GSM 2G networks may not be commonly supported because the roaming agreements and the implementation of GSM protocols may not support roaming where calls stay active even though the subscriber moves to a completely-separate network. In contrast, the WiMax specification generally assumes voice and other media services are managed at the application layer of the traditional OSI stack. For example, two separate networks such as Clearwire® or NextWave® may provide mobile services through WiMax. If a subscriber belonging to the Clearwire® network moves from a location serviced by Clearwire® to a location serviced by NextWave® (but not Clearwire®), the IP address of the mobile device will likely change. There exists a need in the art for seamless handover of an active telephone call or other media sessions, even though the subscriber has moved between the two heterogeneous IP-based mobile networks, also known as making a vertical handover.

A need exists in the art for the vertical handover to be managed at the application layer of the OSI stack. Next-generation mobile networks generally assume voice services are transmitted through VoIP and managed at the application layer. This network architecture provides significant opportunities for companies managed independently of the mobile network operators, such as Skype®, Google®, Yahoo®, or Truphone® to provide voice, video, or other media services.

These and similar companies may offer end users a communications service. The communications service could be delivered through software programs operating on a mobile device and may have access to the Internet via the mobile operator's data network.

However, the software programs may not have control over low-level functions such as managing the MAC address or associating the mobile device with a particular base station. What is needed in the art are efficient methods and systems to support active call handover for communications services, as the mobile device moves between heterogeneous IP networks. There exists a need in the art for software programs to (i) detect new IP addresses becoming available on the mobile device and (ii) monitor the quality of the links to decide that a handover is desirable, and (iii) execute the handover as efficiently as possible. Thus, there exists a need in the art for seamless handover to be managed via software operating as an application on the mobile device.

In addition, a need exists in the art for the proper management of the jitter buffer in anticipation of call handover, such as a sudden change in jitter upon handover. A need exists in the art for handover to adequately support media control protocols that may operate on a separate port than media, such as the Real-Time Control Protocol (RTCP) or Secure Real-Time Control Protocol (SRTCP). Media control protocols can be helpful for monitoring quality and reporting back to the originating device of a media stream about the attributes of media received at a corresponding node. A need exists to provide feedback to a node through media control channels, allowing the node to introduce additional channel coding in the media, for example, if excessive bit errors are observed on the receiving side.

A further need exists, in the case where packet loss is observed on the terminating side, to provide feedback to the originating device in order to implement forward error correction (FEC) codes such as packet duplication, or switch to a different, more frame-independent codec such as switching from G.729b to the Internet Low-Bandwidth Codec (iLBC). A need exists in the art to efficiently handover media control messages from a receiving device to a transmitting device in order to quickly evaluate quality of media during handover and determine if the handover is successful or complete. And other needs exist in the art as well, as the list recited above is not meant to be exhaustive but rather illustrative.

SUMMARY

Methods and systems are provided for handover of active media sessions such as telephone calls as a mobile device moves between heterogeneous IP networks. An objective of the invention is to address the challenges noted above for vertical handover of a media session with a mobile device, while also providing desirable results, such as reducing complexity and increasing speed and/or efficiency.

A media session between a mobile device at a first IP address and a corresponding node can consist of a first media stream transmitted by the mobile device and a second media stream transmitted by the corresponding node. The mobile device or the corresponding node may transmit or receive packets through a NAT router in a first media session. The NAT may also translate ports in addition to addresses. The media session may optionally include a media control channel to provide feedback from the receiving node to the transmitting node regarding the quality of media received. The media control channel could be implemented through standard methods such as RTCP, SRTCP, or proprietary techniques. The media control channel could also consist of non-media packets or non-media information inserted within a media stream.

The mobile device can acquire a new IP address, representing a connection through a second network, while the media session is active. The new IP address may belong to a network that is managed by a different operating entity than the network providing Internet access from the subnet via which the first media stream is transmitted by the mobile device and the second media stream is received by the mobile device. IPv4, IPv6, or future revisions of these packet-switched addressing schemes could be the type of addresses assigned to either or both of the mobile device and the corresponding node. The routing of packets from the new IP address may also be through a NAT router. The mobile device or a software routine operating on the mobile device can determine that handover of the media session to the new IP address is preferred, based on the relative performance of the network providing the first IP address and the network providing the second IP address.

In one exemplary embodiment, (i) a first media stream is sent from a mobile device assigned a first IP address to a corresponding node and (ii) a second media stream is sent from the corresponding node to the mobile device at the first IP address. The mobile device can acquire a second, new IP address with connection to the public Internet provided through a NAT router, and the corresponding node has either (i) an IP address that is publicly routable or (ii) an IP address with a connection to the public Internet provided through a full cone NAT router. When the mobile device acquires the second IP address, the mobile device may begin sending a third media stream to the corresponding node, wherein the first and third media streams may also be transmitted concurrently. The first and third media stream can represent separate communication channels for media transmitted from the mobile device to the corresponding node. The destination IP address and port for the third media stream can be the same destination IP address and port associated with the first media stream. The mobile device may indicate to the corresponding node that a handover is taking place by (i) transmitting a call-control message to indicate the handover to the corresponding node or (ii) transmitting a message inserted into the first or third media streams directly; alternatively, the presence of the third media stream may serve as a signal to the corresponding node that a handover is taking place.

The corresponding node can observe the source IP address and port for the third media stream, which would likely be different than the source IP address and port implemented by the mobile device at the second IP address, if the mobile device transmits packets through a NAT router. The corresponding node can transmit a fourth media stream to the mobile device, and the destination IP address and port for packets in the fourth media stream can be the source IP address and port observed by the corresponding node in the third media stream. In this manner, the fourth media stream can properly traverse the NAT router serving the mobile device at the second IP address without previously requiring the mobile device to (i) transmit probes through the NAT router, (ii) discover external port bindings and IP address, and (iii) communicate those ports and IP address to the corresponding node via a call-control message. Each of these steps would consume valuable time during a handover process.

In addition, the source IP address and port implemented in the fourth media stream transmitted by the corresponding node can be the IP address and port used by the corresponding node to receive both the first and third media streams. The use of the same IP address and port as the source address/port for transmission of the fourth media stream, representing the IP address and port where the corresponding node receives the first and third media streams, may more readily address NATs in front of both the mobile device and the corresponding node. The corresponding node may transmit the second and fourth media stream concurrently.

During handover, the mobile device can monitor both the first IP address for receipt of the second media stream and the second IP address for receipt of the fourth media stream. A second media control channel can be subsequently and optionally implemented for the third and fourth media streams to provide feedback information to each transmitting node about the quality of information received. After a period of time when both the third and fourth media streams are successfully implemented, either the mobile device or corresponding node may signal the handover is complete and the first and second media streams can be terminated. The media session, now consisting of the third and fourth media streams, can continue, and the mobile device can subsequently monitor network connections to determine if another handover is preferred.

In exemplary preferred embodiments, the media session and handover can be managed through a software program operating on the mobile device. A user may access a communications service that supports media on a mobile device, such as voice calls to telephone numbers, generally free "peer-to-peer" calling to other devices with Internet access, or video services. A software program operating at the corresponding node could be compatible with the software program on the mobile device. For example, both the mobile device and corresponding node can operate compatible software such as Skype®, GoogleTalk®, compatible SIP clients, or similar software. The software operating at the mobile device and the corresponding node may communicate call control through one or several proxy servers in order to establish the first media session. A software routine may monitor the quality of network connections for the mobile device and predict that a different network connection will be superior for communication in the future. The software operating on the mobile device may include a handover-predictive jitter buffer, such that when the software routine determines a future handover is preferred, a jitter buffer in the mobile device implemented for the receipt of media can be increased before handover and subsequently decreased after handover.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1 is a graphical illustration of an exemplary system, where media is transmitted and received by a mobile device and a corresponding node before handover according to one exemplary embodiment of the invention.

FIG. 2a is a graphical illustration of software and hardware components for a mobile device and a corresponding node.

FIG. 2b is a graphical illustration of an exemplary call-control channel between a mobile device and a corresponding node.

FIG. 2c is a graphical illustration of an exemplary system where a node can determine the presence and type of NAT.

FIG. 3 is a graphical illustration of an exemplary system where the mobile device acquires a second IP address associated with a NAT router and the mobile device begins transmitting media from the second IP address during handover.

FIG. 8a is a simplified tabular summary illustrating packet-receipt timings and jitter-buffer settings during handover for a mobile device according to an exemplary preferred embodiment.

FIG. 11 is simplified tabular summary illustrating the source and destination IP addresses for media and media control packets transmitted and received during handover process according to an exemplary embodiment.

DETAILED DESCRIPTION OF EXEMPLARY EMBODIMENTS OF THE INVENTION

1. FIG. 1

Figure 4:
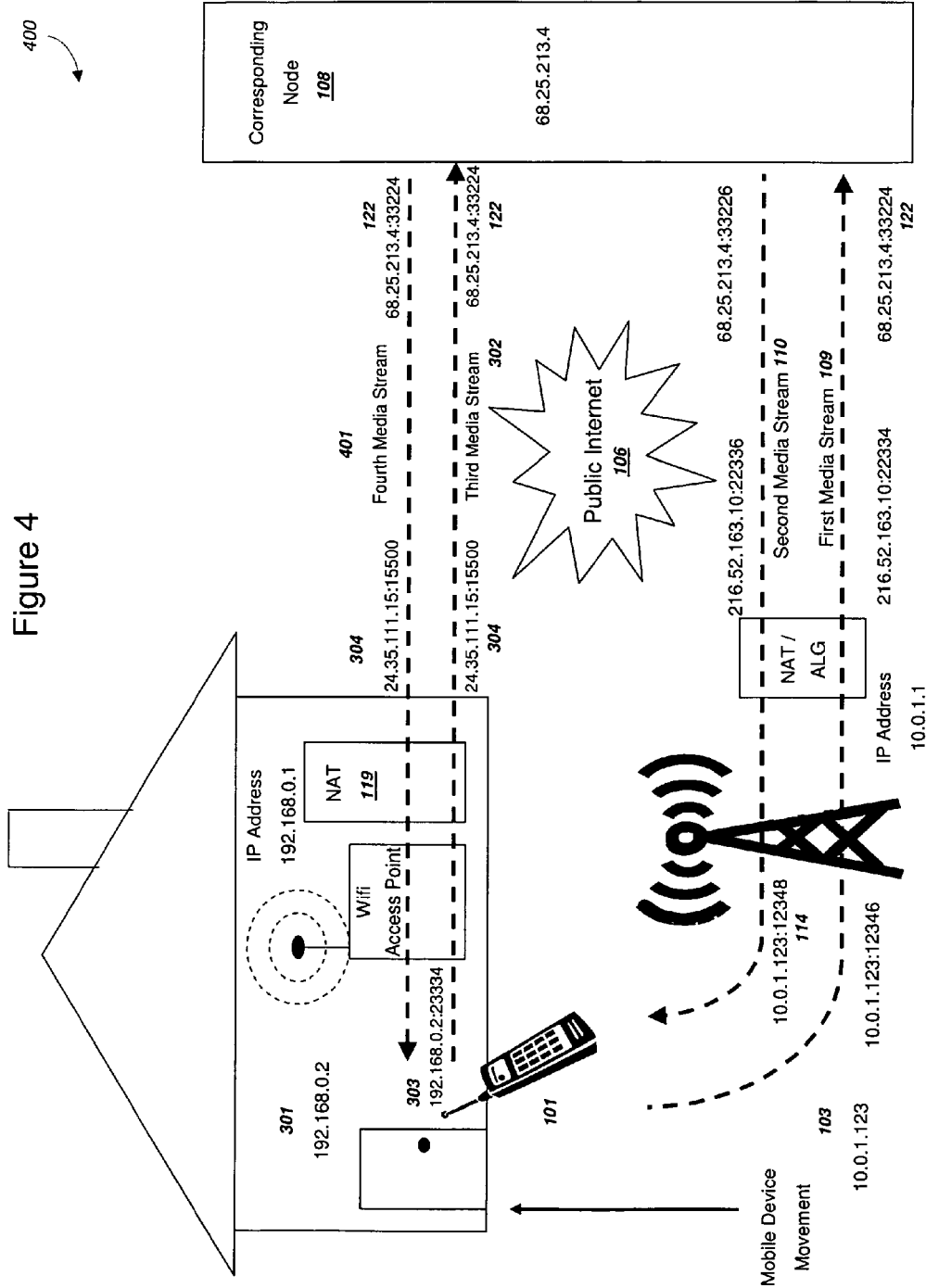
FIG. 4 is a graphical illustration of an exemplary system where the mobile device and corresponding node transmit and receive media during handover according to an exemplary embodiment.

FIG. 1 is a graphical illustration of an exemplary system, where media is transmitted and received by a mobile device and a corresponding node before handover according to one exemplary embodiment of the invention. The system 100 includes a mobile device (MD) 101 operating within a mobile network (MN) 102. MD 101 preferably is associated with an IP address 103 and can communicate through radio-frequency spectrum and may implement Internet protocols. Although an IPv4 address is shown for MD 101, the MN 102 could implement IPv6, combinations of IPv4 and IPv6, or a similar packet-switched addressing scheme.

Many methods are available for associating an IP address 103 with MD 101. For example, a particular MAC address assigned to hardware within MD 101 can be temporarily assigned an IP address through methods such as Dynamic Host Configuration Protocol (DHCP) for a wireless local area network (WLAN). Alternatively, MD 101 can be associated with an IP address via a Packet Data Protocol (PDP) Context Activation for General Packet Radio Service (GPRS) networks and subsequent standards. Other standards-based methods for a MD 101 to acquire an IP address are available as well. Alternatively, the IP address 103 could be entered by the end user or permanently assigned to the device, similar to the International Mobile Equipment Identity (IMEI) number assigned to devices according to 3GPP standards. The specific IP address numbers shown in FIG. 1 and subsequent figures are for illustration purposes, and other IP addresses could be implemented on each appropriate element.

MD 101 may have a software program operating on the device to manage voice, video, or other streaming communications, and the software program may interface with a user for entering telephone numbers, names, e-mail addresses, or other user IDs with which a user may wish to communicate. The software program may be embedded within the device, such as included within the MD 101 operating system or chip set, or may be a separate application downloaded and installed by the end user. MD 101 may be a mobile phone handset, a laptop computer, a PDA, a tracking device associated with a physical object such as a vehicle, or similar devices that operate software programs and communicate within radio-frequency spectrum. Actions performed by MD 101, such as (i) acquiring IP addresses, (ii) establishing media sessions, and (iii) similar functionality, may be implemented in software operating on MD 101. In addition, MD 101 may have several software programs operating on the device to manage media communications.

The mobile network 102 can provide service to the MD 101 as the user moves within a wide geographical region, such as throughout a city or state. The user may sign up for a communications service that provides services over the Internet, such as paid calling to telephone numbers, free calling to other users on the same communications service, streaming music and video, or discounted calling to telephone numbers through the display of advertisements on the mobile device's screen, among many other examples. The communications service may be provided by a different company than the company operating the mobile network, analogous to using Skype®, Google Talk®, or MSN Messenger® through a broadband connection provided by an ISP. Alternatively, the communications service may be offered by the mobile network operator, similar to traditional mobile voice and data services when a user signs up with communications services such as Verizon®, T-Mobile®, or AT&T Mobility®.

In addition, the communications service may be a service provided by a mobile virtual network operator (MVNO), which may purchase services on a wholesale basis from a mobile network operator and sell services under their own brand; an example of this type of communications service would be with Helio®, which is currently associated with the AT&T® network. In order to access a communications service, a user could either agree to a contract or click on a form to accept a user agreement. The communications service may also have branding information displayed to the user, such as having a logo displayed on a handset screen or printed on the device. The communications service may include software that operates on the mobile device, or a software program that can be downloaded to the mobile device.

Base Station 104 can connect MD 101 to MN 102 via radio communications. Although a single base station is shown, MD 101 may communicate with multiple base stations. MN 102 may implement a NAT router associated with the mobile network, such as MN NAT 105, to connect to the public Internet 106. The NAT router 105 may provide multiple functions including (i) providing a private network internal to the mobile operator, (ii) acting as a firewall between mobile devices and the public Internet for enhanced security within the MN 102, (iii) converting packets between IPv4 and IPv6, and/or (iv) operating as an application-layer gateway (ALG). The application-layer-gateway functionality may be useful for managing communication between mobile devices within MN 102 and external hosts, such as managing ports or call control in SIP-based VoIP calls from mobile devices to external SIP-compatible hosts or devices with connectivity through the public Internet 106.

If IPv6 is implemented within MN 102, MN NAT 105 may be required in order to translate to IPv4 packets for communication with IPv4 hosts or other IPv4 clients with connectivity through the public Internet 106. The NAT router 105 may optionally be omitted, or may be located elsewhere on the Internet. If NAT router 105 is omitted, then publicly-routable IP addresses could be assigned to a mobile device 101 within mobile network 102. NAT router 105, if implemented, generally performs both address translation and port translation, which may also be referred to as "NATP".

The MN 102 may also optionally implement IP header compression 107 in order to conserve radio-frequency bandwidth. Header compression 107 could compress the IP, UDP, and RTP headers in media packets. IP address 103 is shown without header compression. MN 102 is a simplified representation, and MN 102 may contain multiple servers and elements such as base station controllers, routers, NAT routers, authentication servers, and gateways, among other elements. In addition, a plurality of mobile devices may access the Internet via MN 102.

A corresponding node 108 (CN) has connectivity to the public Internet 106. CN 108 may be another mobile device, an IP phone, an analog telephone adapter, a gateway to the Public Switched Telephone Network (PSTN) such as a Cisco AS-5400, a personal computer running a software program for voice or video communications, a server providing features such as voice mail, a server transmitting streaming video such as a television broadcast, or any other device capable of implementing Internet protocols and communicating media with MD 101. CN 108 is preferably an endpoint where media is encoded and decoded and that also implements a codec, some example endpoints being (i) a mobile device that converts digital audio to an analog form for comprehension by a second user, (ii) a camera connected to the Internet that transmits video, and (iii) a server where voice or video is stored for later playback.

CN 108 may also be a computing device running a software program implementing the same protocols as MD 101 to provide "peer-to-peer" communications such as Skype®, Google Talk®, Yahoo Instant Messenger®, MSN Instant Messenger®, AOL Instant Messenger®, or similar programs. CN 108 and MD 101 may implement different protocols, if a server (not shown) between them performs proper translation. In addition, CN 108 could be a relay, proxy server, or session border controller for communication with MD 101, such as providing a public IP address for MD 101 to route packets to a terminating node (not shown). This terminating node could also be one of the many types of corresponding nodes described above, if the CN 108 illustrated in system 100 is a relay.

As illustrated in system 100, MD 101 and CN 108 have established a media session, and the media session could be a telephone call, a video call, or streaming music from an Internet radio station, for example. The media session may be implemented through standards-based protocols such as SIP, IAX2, MGCP, XMPP, or similar standards. The media session may also be implemented through protocols managed by third parties such as Skype®, Cisco's Skinny®, or other protocols capable of establishing media communication between endpoints having Internet connectivity.

The media session may consist of a first media stream 109 (MS 1) transmitted from MD 101 to CN 108 and a second media stream 110 (MS 2) received by MD 101 and transmitted from CN 108. A media stream may constitute a series of packets containing digitized media that are transmitted from a sending node to a receiving node. A media stream may be differentiated from another media stream by observing the source IP:port (i.e. IP address and port number) and destination IP:port within packet headers for packets contained in the media stream, as the packets traverse the Public Internet 106. For example, in system 100 illustrated in FIG. 1, a packet contained in MS 1 109 on the public Internet 106 may (i) have the IP address 216.52.163.10 as the source IP address and 22334 as the source port and (ii) have the IP address 68.25.213.4 as the destination IP address and 33224 as the destination port.

MS 1 109 and MS 2 110 may consist of voice digitized or compressed with a codec such as AMR (adaptive multi-rate), GSM-EFR (Global System for Mobile Communications Enhanced Full Rate), iLBC (Internet Low Bandwidth Codec), VMR (Variable Multi Rate), G.711, or some other codec, and the media may be encapsulated within packets formatted according to the User Datagram Protocol (UDP), Transmission Control Protocol (TCP), or similar or subsequent standards. The media streams MS 1 109 and MS 2 110 could also consist of video digitized with a video codec such as MPEG, H.264, VC-1, or some other video codec, or a combination of voice and video, and also be transmitted within UDP or TCP datagrams.

MS 1 and MS 2 may be transmitted according to the Real-time Transport Protocol (RTP), Secure Real-time Transport Protocol (SRTP) or other methods that properly sequence the media for playback at the receiving end. Although the transmission of media via UDP may be preferred, other protocols could be implemented as well, such as TCP. Note that TCP could be required for the media if a NAT router or firewall along the media path blocks UDP packets for example.

The media session consisting of MS 1 and MS 2 may optionally include a feedback mechanism to each node to indicate the quality of the media stream at the receiving end, through implementing a media control protocol. Real-time Transport Control Protocol (RTCP) stream 2 (111) consists of packets periodically sent from MD 101 to CN 108 to provide information such as round-trip delay, packet loss, bit errors, or jitter for media received in MS 2 110. An example message would be an RTCP receiver report. Feedback on the quality of the media transmitted can be useful for improved management of mobile-IP links, which naturally incur bit errors and packet loss as the mobile subscriber moves into areas with lower-quality coverage from base stations.

Based on the feedback within RTCP stream 2 111, the CN 108 may make adjustments such as implementing forward-error-correction (FEC) techniques or changing the codec for transmission of MS 2. Similar adjustments to media transmitted in MS 1 by MD 101 could be made through RTCP stream 1 112. Some examples of feedback mechanisms other than RTCP include Secure Real-time Transport Control Protocol (SRTCP), RR JITTER or RR LOSS messages within the IAX2 protocol, and proprietary methods.

The media control protocol to provide feedback can also be implemented logically within MS 1 and MS 2, such that feedback messages are inserted within the media stream, which is the case with IAX2 RR JITTER and RR LOSS messages. SRTCP is associated with SRTP, which allows encryption of the media for transmission through the public Internet 106, thereby maintaining confidentiality as the media passes through routers and hops on the public Internet 106 that are not under the control of either a mobile subscriber, MN 102, or the user at the corresponding node 108.

The feedback mechanism may be implemented in ways other than an explicit media control channel such as that shown in RTCP stream 1 112 and RTCP stream 2 111, such as using "out of band" signaling through a call-control channel such as SIP NOTIFY messages, or methods that are not based on current, widely deployed IETF RFC standards. The feedback mechanism implemented via RTCP stream 1 112 and RTCP stream 2 111 is not required for useful communication between MD 101 and CN 108, but may be helpful for managing quality of the media and also managing handovers.

MD 101 preferably transmits and receives media through the use of specific ports. In the exemplary system illustrated in system 100, IP:port 113 is used by MD 101 for sending media and IP:port 114 is used by MD 101 for receiving media. IP:ports 113 and 114 could use the same port number and, although they are shown as IPv4 addresses, they could also be IPv6 addresses, or comply with similar packet-switched addressing schemes. If the MN NAT 105 functions as an application layer gateway (ALG), with SIP calls for example, the MN NAT 105 may make adjustments to the Session Description Protocol (SDP) messages within call-setup requests, to properly inform the CN 108 of the public IP ports on the MN NAT 105 for sending or receiving the media streams.

For the example media session illustrated in system 100, according to the SIP protocol with RTP media, the ALG functionality of MN NAT 105 maps packets (a) between IP:port 113 and IP:port 115 and (b) between IP:port 114 and IP:port 116. Insertion of IP:port 115 and 116 into the body of the SDP messages transmitted by MN NAT 105 may be useful if the MD 101 belongs to a private IP network (i.e. has an IP address that is not publicly routable), as shown by mobile-device IP address 103 (10.0.1.123), which is among the IP addresses that are reserved for private networks according to IETF RFC 1918, which is hereby incorporated herein by reference.

If a software program on the MD 101 is operating a protocol that is not understood by an application layer gateway operating on MN NAT 105, such as may be the case with a proprietary protocol or with encrypted packets, as examples, the above-described port translation within the body of session-description messages at MN NAT 105 may not be possible by the application layer gateway functionality operating on MN NAT 105. In this case, IP:ports 113 and 114 may preferably use the same port and IP:ports 115 and 116 may also preferably use the same port. IP:port 122 of CN 108 receives media transmitted by MD 101 in MS 1 109, and IP:port 123 of CN 108 transmits media to MD 101 in MS 2 110. Note that IP:port 122 and IP:port 123 are each an IP address and port that are associated with the corresponding node.

Note that, as used herein, one or more IP addresses or IP-address-and-port pairs (i.e. IP:ports) being "associated with" an entity (e.g. a mobile device or a corresponding node) does not necessarily mean that these IP addresses and/or IP:ports are located at (i.e. assigned to) the entity itself. The "associated with" language also, however, contemplates an arrangement where the entity is behind a NAT router and/or an application layer gateway, which alone or in combination would function to associate these IP addresses and/or IP:ports with the entity. In addition, if the corresponding node is a relay or a node had a publicly routable IP address, the "associated with" language contemplates the IP address and IP:port also being assigned to the device, for example.

Continuing the discussion of FIG. 1, from the perspective of MD 101, the IP address and port associated with the corresponding node (i.e. IP:port 122) is the proper IP:port on the public Internet 106 for MD 101 to transmit packets in order to reach CN 108. If CN 108 has an IP address that is routable on the public Internet, as illustrated in system 100, then the IP address associated with CN 108 can also be considered assigned to CN 108. Conversely, as explained in the preceding paragraph, a public IP address that is associated with a given node—such as CN 108—may not necessarily be assigned to the given node, if, for example, the given node accesses the Internet through a NAT router.

The user operating, owning, or having access to MD 101 may also have an alternate network (AN) 117 that also provides connectivity to the public Internet 106. AN 117 may be or include a separate wireless network, such as a WiFi access point 118 that provides an air interface according to IEEE 802.11 or similar standards. The WiFi access point 118 may obtain Internet connectivity through an alternate network NAT router (AN NAT) 119 having a broadband connection from an Internet Service Provider (ISP) via fixed transmission media such as one or more of Digital Subscriber Line (DSL), cable, fixed wireless, fiber optic cables, etc. The ISP may be an entirely separate entity from the operator of MN 102.

AN 117 may provide superior network connectivity to the MD 101 when the MD is within proximity of AN 117. The superior network connectivity would likely take the form of various combinations of higher signal-to-noise ratios (SINRs) via stronger signals, lower power requirement, lower costs for bandwidth, less packet loss, lower delay, fewer bit errors, greater overall bandwidth, less jitter, enhanced security, and/or other benefits.

Since AN 117 likely belongs to a different subnet of the public Internet 106 than does MN 102, a different IP address may well be assigned to MD 101 when MD 101 connects to AN 117. For example, the ISP serving AN 117 could provide connectivity to the public Internet 106 using a class B or class C IPv4 address range that is different from the IPv4 address range belonging to MN 102. Further, the routing of packets from CN 108 to MD 101 will change when MD 101 is receiving those packets via AN 117, since the destination of packets on the public routable Internet 106 would be through the alternate-network public IP address 120 associated with AN 117.

As stated above, AN 117 may have AN NAT 119 that converts packets between being addressed using internal, private IP addresses within the AN 117 to using addresses routable on the public Internet 106. AN NAT 119 can be the default gateway within AN 117, with an example default gateway IP address 121 shown as 192.168.0.1. The AN NAT 119 may be integrated with the Wi-Fi router 118, and/or with a DSL modem or cable modem, or may reside within the data centers operated by an ISP. Note that multiple levels of NAT may exist between MD 101 and the public Internet 106, as opposed to the single AN NAT 119 that is illustrated in system 100. In some embodiments, AN NAT 119 may not be present, in which case IP addresses assigned within AN 117 may be publicly routable.

Although the wireless network within AN 117 is illustrated as being a WiFi network, the local IP connectivity could be provided using various wireless technologies such as Bluetooth, infrared, Ultra Wideband, a femtocell, and/or similar local-area-networking technologies. In addition, the AN 117 IP connectivity could be directly provided by a wired connection, such as when the mobile subscriber plugs an Ethernet cable or Universal Serial Bus (USB) cable directly into MD 101, if MD 101 is a laptop computer, for example.

And although the alternate network 117 is illustrated as being roughly coextensive with a residence, AN 117 may be instead be situated as roughly coextensive with an office building, a commercial establishment such as a coffee shop that provides WiFi access, a municipal WiFi hotspot, an access point provided by a third-party "mesh network", a university campus, and/or other physical locations where IP connectivity separate from MN 102 is available to MD 101. In addition, AN 117 could be a separate wireless network provided by a different mobile network operator, among many other possibilities. AN 117 and MN 102 would commonly be and herein are referred to as "heterogeneous" networks and the transfer of a media session involving MD 101 between AN 117 and MN 102 would commonly be and herein is referred to as a "vertical handover".

2a. FIG. 2a

FIG. 2a is a graphical illustration of software and hardware components for a mobile device and a corresponding node, in accordance with an exemplary embodiment. MD 101 and CN 108 may consist of multiple components in order to provide services such a voice or video calls to a user. The physical interface 201 of MD 101 may provide radio-frequency communications with networks including the MN 102 via standards such as GPRS, UMTS, mobile WiMax, CDMA EVDO, and/or other mobile-network technologies. The physical interface 201 may also provide connectivity to local networks via technologies such as 802.11, Bluetooth, or possibly wired connections such as Ethernet, when those networks are available to MD 101, among other possibilities.

The physical interface 201 can include associated hardware to provide the connections such as radio-frequency (RF) chipsets, a power amplifier, an antenna, cable connectors, etc. If CN 108 is also a mobile device, such as another mobile handset on MN 102 or a another wireless network providing Internet connectivity, the physical interface 206 can be similar to the physical interface 201 and support radio-frequency communication with a transceiver station associated with a base station similar to base station 104 connecting to a mobile network. If CN 108 is a personal computer, server, or gateway, or other generally stationary device, the physical interface 206 may be a wired interface connecting to Ethernet and similar LAN technologies. And other possibilities exist as well, without departing from the invention. The physical interfaces 201 and 206 could also include microphones and speakers for audio, or a camera for video.

Device drivers 202 and 207 can communicate with the physical interface 201 and 206, respectively, providing access to higher-level functions on MD 101 and CN 108. Device drivers may also be embedded into hardware or combined with the physical interfaces. MD 101 and CN 108 may preferably include an operating system 203 and 208, respectively, to manage device drivers 202 and 207, respectively. The operating systems can also manage other resources such as memory and may support multiple software programs operating on MD 101 and CN 108 at the same time. The operating systems 203 and 208 can include Internet protocol stacks such as a UDP stack, TCP stack, RTP stack, and the operating systems 203 and 208 may include voice and video codecs. Voice or video codecs could instead be integrated with the device driver 202 or 207, embedded into hardware, or included in software programs. An example operating system 203 for MD 101 includes Linux, Windows® Mobile, or Symbian®.

The software program 204 or 209 may be an application programmed in a language such as C or C++, and could provide functionality such as a VoIP client, a video client, instant messaging, e-mail, and/or web-browsing capabilities. Many of the logical steps for operation of MD 101 and CN 108 can be performed in software by various combinations of device driver 202 and 207, operating system 203 and 208, and software program 204 and 209, respectively.

The software program 204 or 209 may also contain a handover-predicting jitter buffer 222, which may increase the jitter-buffer size before handover and decrease the jitter-buffer size after handover. The handover-predicting jitter buffer could alternatively be included in operating systems 203 or 208, or device drivers 202 or 207, among other possibilities.

When MD 101 is described as performing various actions such as acquiring a new IP address, monitoring a port, transmitting a packet or media stream, or similar tasks, specifying that MD 101 performs an action can refer to (i) software, hardware, and/or firmware operating within MD 101 performing the action, or also (ii) software, hardware, and/or firmware operating with MD 101 in conjunction with software, hardware, and/or firmware operating on external servers performing the action. Note that MD 101 and CN 108 may also include user interfaces 205 and 210, respectively, each of which may include one or more devices for receiving inputs and/or one or more devices for conveying outputs. User interfaces are known in the art, and thus are not described in detail here.

For many example media sessions between MD 101 and CN 108, the physical interfaces, device drivers, operating systems, and user interfaces may be different, such as if MD 101 is a mobile handset and CN 108 is a gateway to the PSTN. However, the software programs 204 and 209, operating on MD 101 and CN 108, respectively, could be of the same type, such as a Skype® client on MD 101 and another Skype® client on CN 108. Other example compatible software programs operating on both MD 101 and CN 108 could include SIP clients, IAX2 clients, or other "peer-to-peer" clients such as GoogleTalk®.

The device drivers 202 or 207, operating systems 203 or 208, and software programs 204 or 209 could optionally be combined into an integrated system for managing MD 101's or CN 108's functionality, respectively. In addition, the operating systems 203 or 208, and software programs 204 or 209, may be combined respectively within the same device. Although a single physical interface, device driver set, operating system, software program, and user interface are illustrated in FIG. 2a for each device, MD 101 and CN 108 each may contain multiple physical interfaces, device drivers, operating systems, software programs, and user interfaces. And other arrangements could be used as well, without departing from the invention.

2b. FIG. 2b

FIG. 2b is a graphical illustration of an exemplary call-control channel between a mobile device and a corresponding node. FIG. 2b is illustrated according to common techniques implemented for call-control channels within the prior art. The call-control channel 2b can be used to establish a media session between two endpoints or nodes with Internet connectivity, even though the two endpoints may not have the ability to initially directly communicate due to the presence of NATs or firewalls, illustrated by NATs 211 and 212.

The endpoints MD 101 and CN 108 may each register with a proxy server 213 or 214, respectively. The registration process generally opens external port bindings on NATs 211 and 212 for communication with MD 101 and CN 108, respectively. The open external port bindings on NATs 211 and 212 may be kept open by periodic messages sent by MD 101 and CN 108 to their respective proxy servers, and the proxy servers may send messages such as call requests through an opened port on a NAT or series of NATs between the proxy server and a node. The proxy servers could also be referred to as supernodes according to the Skype® protocol, Asterisk servers according to the IAX2 protocol, SIP proxies according to the SIP protocol, or Gatekeepers according to the H.323 protocol, for example.

A call request 215 can be generated by MD 101 when an end user keys in a telephone number and presses "dial", or when an end user clicks on an icon or name within a buddy list, as examples. The call request may be formatted according to a protocol that is capable of establishing media sessions through the Internet, such as SIP, XMPP, IAX2, H.323, MGCP, Skype®, or similar methods. Call request 215 is illustrated as formatted according to the SIP protocol. The call request may be encapsulated in packets according to a transport protocol that may include TCP, UDP, TLS (Transport Layer Security), SSL (Secure Socket Layer), or similar methods that are commonly supported on the Internet and also NAT routers.

Proxy server 213 can process the call request by locating the appropriate proxy server for CN 108 via methods such as the Domain Name System (DNS) or a distributed hash table (DHT), as examples. Although not shown, there may be additional layers of proxy servers, such as a gateway proxy, wherein the proxy server 213 passes call requests up to a gateway proxy, and the gateway proxy then locates and passes the call request to a gateway proxy for the corresponding node's network. In addition, with a large network of hundreds of thousands of nodes or more, a network can consist of a plurality of distributed proxy servers. Further, each proxy server can support a plurality of nodes.

When the call request 215 reaches the corresponding node proxy 214, the corresponding node proxy 214 may locate and forward the call request to the corresponding node 108. The call request 215 may typically include information useful for setting up the media session 216, such as a desired codec and the appropriate public IP address and port for CN 108 to transmit media to, perhaps representing an IP:port on a public Internet interface of NAT router 211, if it is present. CN 108 may respond to the call request, with a message that includes the appropriate public IP:port for MD 101 to transmit media to, illustrated in FIG. 2b according to the SIP protocol with "200 OK". Other call-control messages may also be passed between the nodes and proxy servers, such as TRYING and 180 PROCEEDING, as examples. Through these and similar methods, MD 101 and CN 108 can establish media sessions and communicate call-control information.

Once the initial call request and response between MD 101 and CN 108 has been processed, the endpoints may also then communicate further call control directly between them, since a communication channel has been established, although direct communication of call control between MD 101 and CN 108 may require either implementation of a different protocol than SIP, or future extensions to SIP as currently specified in IETF RFC 3261, which is hereby incorporated herein by reference. After an initial call request is processed by the endpoints, further call-control messages may be processed, such as SIP Re-Invite, SIP UPDATE, or similar transfer messages in other protocols, a SIP BYE or similar "hangup" messages in other protocols to terminate the media session. Other call-control messages may add features such as establishing a conference with a third endpoint (not shown). And other examples are possible as well.

Although a single protocol (i.e. SIP) is illustrated in FIG. 2b, the two endpoints may not necessarily use the same call-control protocol. For example, MD 101 may implement the SIP protocol, whereas CN 108 may implement the XMPP protocol. Proxy server 213 or 214 may translate the protocol in order to establish communication between the endpoints, or the translation may occur on a third server within the call-control flow. If the two endpoints implement different call-control protocols, preferably they can communicate according to the same codec or, alternatively, implement transcoding. FIG. 2b also illustrates that a relay may be used to communicate media between two NATs, and in fact the use of a relay may be required if the two NATs are symmetric. Further, the relay illustrated in FIG. 2b may be used during a call handover process. For example, the relay could function as an intermediate corresponding node when MD 101 moves to AN 117, and the relay could then forward packets to CN 108, representing a terminating node.

2c. FIG. 2c

FIG. 2c is a graphical illustration of an exemplary system where a node can determine the presence and type of NAT. FIG. 2c is illustrated according to common techniques implemented within the prior art to determine the presence and type of NAT. In system 200, a node with an IP address can probe servers on the public Internet 106 to determine the type of NAT that may connect the node to the public Internet. The node may send a packet such as a query 217 to a first server 218, illustrated as STUN A (Simple Traversal of UDP through NAT, IETF RFC 3489, which is hereby incorporated herein by reference), which can then respond (at 219) to the source IP address and port it observed as transmitting the query.

The response 219 can contain the source port and IP address that the server observed in the query 217 transmitted by the node. The first server 218 can also then forward the query to a second server 220, illustrated as STUN B. The second server then also forwards a response 221 back to the source port and IP address for the original query 217 transmitted by the node. The node listens on the port on which it transmitted the query, in order to obtain a response from the servers. If two responses 219 and 221 are received, one each from the first and second servers 218 and 220, respectively, the node may determine the NAT type is a full cone. If only one response is received, from the first server for example, the node may determine the NAT type is either (i) symmetric or (ii) a port restricted cone, or (iii) a partial cone.

Further queries from the node also could further resolve the NAT type. Other, similar, techniques besides STUN can be used by a node to determine the NAT type. Although a single NAT is shown between the node and the servers 218 and 220, multiple NATs may exist between the node and the servers. In this case, the multiple NATs can be evaluated as a single logical NAT. Example descriptions of the common types of NATs such as full cone NAT routers can also be found in IETF RFC 3489, section 5.

3. FIG. 3

FIG. 3 is a graphical illustration of a system where the mobile device 101 acquires a second IP address IP 301 that is associated with a NAT router, and the mobile device begins transmitting media from the second IP address during handover. Since MD 101 can be a mobile device operated by a user or subscriber that changes location, the subscriber may move within range of alternate network 117 that also provides Internet access (in addition to MN 102 providing Internet access), as illustrated by system 300 in FIG. 3.

In order to obtain connectivity to the Internet through the alternate network 117, the mobile device 101 can acquire IP address 301 that is provided by a local area network within alternate network 117. Although IPv4 addresses are shown within AN 117, IPv6 or similar addressing schemes could be implemented. IP address 301 may be acquired by various methods such as DHCP, and MD 101 has sufficient computing power to associate with multiple IP addresses simultaneously. A software program 204 operating on MD 101 can observe that IP address 301 becomes available via periodic queries to an operating system 203 or a device driver 202.

IP address 301 can be considered assigned to MD 101 when a software program 204, operating system 203, or device driver 201 can transmit or receive packets using IP address 301. Under many scenarios, IP 103 and IP 301 can be available simultaneously to a software program 204 operating on MD 101, such as when MD 101 is within range of more than one network. The software program 204 may be a component of a communications service, such as a program downloaded and installed on MD 101. MD 101 may measure the quality of the two network connections, which can include measurements at the physical, data-link, and network levels. Quality can be measured according to several parameters, including power levels, signal-to-noise ratios, bit errors, packet loss, delay, and jitter. Quality may also be measured on both the uplink and downlink, for transmitting and receiving data.

MD 101 can include a software routine to determine that handover of the media session from IP 103 to IP 301 is preferred. A software routine operating within MD 101 may determine that IP 301 is preferred for communication due to a combination of increased signal-to-noise ratios, reduced packet loss, reduced bit errors, reduced power consumption, reduced delay, reduced jitter, reduced costs for bandwidth, increased stability of network quality, increased bandwidth available for communication, and/or one or more other network characteristics according to which AN 117 would provide a superior connection to that provided by MN 102. The software routine to determine handover may be operating in conjunction with software program 204, operating system 203, or device driver 202, among other possibilities, and may also function as a subroutine within a larger software program.

Either (i) MD 101 or (ii) a software routine that determines when handover is preferred may also predict that IP 301 may become preferred for communication, based on monitoring and comparing the relative quality of communication through AN 117 and MN 102. For example, even though the network connection providing IP 301 may initially have a relatively weak signal compared to the network connection providing IP 103, with corresponding higher bit errors, higher packet loss, or greater delay on the network providing IP 301, MD 101 can monitor the network providing IP 301 as MD 101 approaches the example AN 117 illustrated as a WiFi access point 118 in system 300.

If the network connection or IP connectivity between MD 101 and WiFi access point 118 improves at a sufficient rate, MD 101 may predict that IP 301 will become preferred over IP 103 and, consequently, MD 101 may initiate handover before communication via IP 301 is actually superior to communication via IP 103. Conversely, MD 101 may observe that communication through IP 103 is degrading at a sufficient rate that communication via IP 301 will likely become preferred, even though the quality of communication via IP 301 is relatively static or perhaps improving only slowly. Again, in this instance of degrading quality for communication via IP 103, MD 101 may determine that IP 301 will become preferred, and MD 101 may also initiate handover even though IP 103 is still superior to IP 301 when MD 101 initiates handover procedures.

Once MD 101 can decide that either (i) IP 301 is preferred for communication or (ii) IP 301 may become preferred for communication, MD 101 could initiate handover procedures that will be both rapid and also reduce the probability that a user will notice gaps, delays, or distortion in the media during the handover process. Likewise, efficient handover procedures can reduce the impact on media received at CN 108. Further, MD 101 may also automatically establish a duplicate media path when the quality of the network through IP 301 reaches minimum thresholds, or the performance of either MN 102 or AN 117 is greater or less than specified parameters.

A duplicate media path can provide superior quality, and trends in quality may not be predictable. Thus, the techniques described in the present invention could be implemented for the purposes of rapidly establishing a duplicate media channel, with or without the intent of terminating the first media session consisting of MS 1 and MS 2. In addition, a handover could be preferred in order to obtain increased quality, reduced power, reduced interference, or other benefits from simply establishing a duplicate media channel through a separate IP network than MN 102.

After acquiring the IP 301, MD 101 may determine a handover is preferred due to the benefits of using AN 117. Perhaps prior to initiating handover, or perhaps during the establishment of the first media session that includes MS 1 109 and MS 2 110, MD 101 in system 300 may evaluate whether (i) CN 108 has an address that is fully routable on the public Internet (i.e. does not belong to the set of private addresses in IETF RFC 1918) or (ii) CN 108 connects to the Internet via a NAT router.

MD 101 can use multiple methods in this evaluation, such as observing if the IP addresses and ports within fields of received SIP and/or SDP messages match the actual ports used for media transmission in MS 2 110, or determining if the CN 108 user agent belongs to (a) a class of gateways to the PSTN (which the MD could therefore reasonably expect to have public IP addresses), or (b) a class of session border controllers which would also likely have public IP addresses. A software program operating on MD 101, as opposed to the physical hardware, may evaluate if CN 108 has a publicly-routable IP address or rather connects to the public Internet via a NAT router. In addition, MD 101 will likely have an call-control channel—such as that illustrated in FIG. 2b—implemented in order to set up MS 1 109 and MS 2 110, and MD 101 could query CN 108 through the call-control channel, requesting that CN 108 to provide an assessment of its NAT environment.

Further, MD 101 could have gained knowledge of any NAT routers in front of CN 108 during the setup of MS 1 109 and MS 2 110. Alternatively, CN 108 may report its NAT environment to a centralized server such as a registrar or proxy server 214, and MD 101 could submit a query to the central servers. CN 108 can evaluate the presence of any NAT routers between CN 108 and the Public Internet 106 via the techniques illustrated in system 200. MD 101 could also query CN 108 directly by inserting a non-media "NAT query" packet within MS 1 and monitor for a response in a non-media "NAT response" packet in MS 2. In summary, there are many methods available for MD 101 to determine if CN 108 has a public IP address, or rather is connected to the Internet via a NAT router such as a full cone NAT.

According to an exemplary preferred embodiment, MD 101 can evaluate before acquiring IP 301 whether CN 108 is assigned a public IP address and, if not, what type of NAT router CN 108's network implements for Internet access, and together these two properties may be referred to as CN 108's NAT profile. Evaluating CN 108's NAT profile before acquiring new IP addresses such as IP 301 can reduce the time required for MD 101 to complete handover. However, MD 101 can bypass an evaluation of CN 108's NAT profile and follow the other steps described in the present invention, although bypassing an evaluation of CN 108's NAT profile may not be preferred if CN 108 connects to the Internet via a partial cone, port-restricted cone, or symmetric NAT.

If (i) CN 108 is assigned a public IP address as illustrated by the system 300 in FIG. 3, or (ii) CN 108 connects to the Internet via a full cone NAT router (not shown), MD 101 may preferably begin transmitting a third media stream (MS 3) 302 from IP 301 to CN 108 with a destination IP:port for the transmitted media packets of IP:port 122, once MD 101 determines that handover is preferred, where MD 101 essentially bi-casts its outgoing media associated with the active media session to CN 108 (and more particularly to the same IP:port 122) via MS 1 109 and MS 3 302. MD 101 can—and preferably does—begin transmitting the third media stream 302 before MD 101 stops transmitting the first media stream 109.

Transmitting MS 3 from IP 301 to IP:port 122 can provide multiple benefits. First, IP:port 122 has already been established by CN 108 as a port for the receipt of media packets, so additional ports do not need to be opened and communicated to MD 101 via a call-control message or similar signaling techniques. Transmission of such as a call-control message may take additional time to both process on the nodes as well as traverse the public Internet, which would slow down the handover process. Further, if CN 108 is behind a NAT router (which it is not in FIG. 3), other ports on an external interface of the NAT router may not be open and bound to a port on CN 108. Opening another port on a NAT router besides IP:port 122 would require time and negotiation of call control between CN 108 and MD 101, further slowing down the handover process.

MD 101 preferably performs a "make before break" handover, such that MS 1 109 and MS 3 302 are transmitted concurrently and include substantially the same media, although a "make before break" handover is not required. A node such as MD 101 or CN 108 may transmit two packets for each codec frame (i) from a different source IP:port or (ii) to a different destination IP:port, and each packet can be considered to belong to a separate media stream. MD 101 may transmit packets for MS 3 302 from IP 301 via IP:port 303. The AN NAT 119 may convert the source IP:port in the packets transmitted by MD 101 in MS 3 302 from IP:port 303 (i.e. 192.168.0.2:23334) on its internal interface to IP:port 304 (i.e. 24.35.111.15:15500) on its external interface. Consequently, CN 108 can observe the source IP:port of (i.e. for packets received in connection with) MS 3 302 as received at CN 108 as IP:port 304.

"Transmitting concurrently" may refer to operating a software routine within MD 101 with sufficient speed that both IP:port 113 and IP:port 303 each transmit a media packet on a sufficiently short time scale, such as with less than 200 milliseconds between the time when IP:port 113 transmits a media packet and IP:port 303 transmits a media packet comprising substantially the same media. Thus, although IP:port 113 and IP:port 303 may transmit at separate points in time on the timescale of a computing device's operating system, which may be on the order of microseconds for example, CN 108 could observe that MS 3 302 and MS 1 109 are effectively duplicate media streams. For example, if 5 packets in a row are dropped on MS 1 109 but not MS 3 302, a process operating on CN 108 could receive copies of the dropped packets in MS 3 302 in order to output media to a user associated with CN 108 without noticeable gaps or delay. Note that the copies of media in MS 1 and MS 3 could be—but do not have to be—identical.

CN 108 can accept and process the duplicate media streams without requiring any previous signaling, because the various software routines operating on CN 108 may efficiently process duplicate media streams. In addition, if the media is transmitted as RTP, then the RTP software stack within CN 108 can also drop duplicate media packets. Software programs that implement RTP according to the IETF RFC 3550 standard (which is hereby incorporated herein by reference) can ignore the source IP address of RTP packets, and can reject or accept media from the synchronization source identifier (SSRC) within a packet containing RTP data.

Thus, MD 101—using both IP 103 and IP 301—can transmit dual copies of the underlying media via MS 1 109 and MS 3 302 to CN 108, and CN 108 can monitor IP:port 122 for both media streams. Transmitting MS 1 109 and MS 3 302 via RTP is not required, and other methods for media transmission and sequencing the media packets could be implemented. CN 108 could identify that duplicate media streams are received by observing that packets received from two different source IP addresses have equivalent sequence numbers in the media packets, and other methods for handling duplicate media streams are available as well for those skilled in the art.

Alternatively, according to a second embodiment, before MD 101 begins transmitting MS 3 302, a call-control message, such as a handover request, could be sent by MD 101 to CN 108, in order to prepare CN 108 to process the duplicate media streams or take other affirmative actions, such as opening ports within firewall functionality that may also operate on CN 108, for example. The call-control message could be sent via a call-control channel such as that illustrated in FIG. 2b, or through a specified control packet transmitted within MS 1 109, or another call-control channel established between MD 101 and CN 108. The call-control message could also be transmitted via the media control channel, such as from the mobile device to IP:port 124 associated with the corresponding node (as shown in FIG. 1).

The call-control message to inform CN 108 of a handover could consist of a call-control signal. Upon receipt of the call-control signal, CN 108 could begin processing MS 3 302, although an explicit call-control signal may not be required. A call-control signal may be preferred, if the software operating at CN 108 will not process MS 3 302 unless a call-control signal is received, which could be the case if the software operating at CN 108 drops or ignores packets received at IP:port 122 that do not originate from IP:port 115.

The call-control signal informing CN 108 of a handover could consist of a value for a UDP checksum in a packet transmitted by MD 101 within MS 1 109. UDP checksums may be disabled by default in MS 1 109 for example, if MD 101 encodes media according to a traditional mobile voice codec such as GSM-EFR, AMR, AMR-WB, QCELP (Qualcomm Code Excited Linear Prediction). These and related mobile codecs are designed to be relatively bit-error robust, in order to compensate for potential bit errors resulting from noise in radio-frequency transmissions, and thus UDP checksums on the media packets may not be normally implemented or may be set to a null value.

Consequently, MS 1 109 may initially be transmitted by MD 101 with UDP checksums disabled or set to a null value, since CN 108 could prefer to accept and process media packets received in MS 1 109 even with bit errors in the underlying datagrams. If UDP checksums are implemented by MD 101 in MS 1 109 and processed by CN 108, a media packet containing information encoded with a bit-error-robust codec could be entirely dropped by CN 108, even though processing the media packet with bit errors may be preferred in order to obtain an approximate representation of the transmitted media.

A signal indicating handover can be transmitted by MD 101 to CN 108 by enabling UDP checksums in MS 1 109 once MD 101 determines handover is preferred, whereas UDP checksums may have been disabled by MD 101 prior to handover. In addition, CN 108 can continue to ignore UDP checksums for the purposes of accepting or rejecting media packets in MS 1 109, and simply note that the presence of non-zero or non-null checksum values indicates a handover is preferred, and subsequently CN 108 may begin monitoring IP:port 122 for the presence of MS 3 302. Other changes to the values of UDP checksums could be implemented by MD 101 to signal to CN 108 that a handover is preferred. If the media is transmitted according to TCP, then changes in the TCP checksums could be implemented as well. Preferably, CN 108 can accept MS 3 302 without an explicit call-control signal, but that capability may not always be available, due to firewall rules or legacy software operating at CN 108.

4. FIG. 4

FIG. 4 is a graphical illustration of an exemplary system where the mobile device and corresponding node transmit and receive media during handover according to an exemplary embodiment. According to a preferred exemplary embodiment, CN 108 observes that the source IP address and port for MS 3 302 is IP:port 304, representing the external port on AN NAT 119 that binds to MD 101 IP:port 303. When CN 108 begins receiving packets in MS 3 302, CN 108 may begin transmitting a fourth media stream (MS 4) 401, representing essentially a duplicate copy of MS 2 110. CN 108 sends MS 4 401 preferably from IP:port 122, with a destination address of AN NAT 119 IP:port 304.

One benefit of transmitting MS 4 401 packets from CN 108 with (i) the source IP:port 122, which is the destination port in MS 3 302 and (ii) the destination IP:port 304, is that AN NAT 119 may be symmetric or a port-restricted cone. Alternative ports may be implemented as the source or destination port for MS 4 401, but that would likely require obtaining the proper port bindings between MD 101 and AN 119 through techniques such as that illustrated in system 200, as well as communicating the ports between MD 101 and CN 108 via a call-control channel or call-control packets inserted in MS 1 109 or MS 3 302. Obtaining new port bindings and communicating the ports prior to the transmission of media may significantly slow the handover process. CN 108 could transmit to a different destination port than IP:port 304, if AN NAT 119 was a full cone or restricted cone NAT, but again in that case CN 108 may need to be informed of the type of NAT that AN NAT 119 is, which would undesirably require communication and processing time. Consequently, the transmission of MS 4 401 from IP:port 122 to IP:port 304 may be preferred.

According to a preferred exemplary embodiment, CN 108 may begin transmitting MS 4 401 without receiving an explicit handover call-control message from MD 101. CN 108 can observe the received duplicate media streams MS 1 109 and MS 3 302, where media is transmitted from MD 101 via two separate IP addresses, IP 103 and IP 301. The receipt of duplicate media streams may signal to CN 108 that MD 101 is initiating handover and has a new, preferred IP address 301, observed by CN 108 to be the public IP address belonging to AN NAT 119.

This logical call-control signal consisting of duplicate media may be transmitted from MD 101 to CN 108 before a separate call-control message such as a SIP Re-INVITE or SIP UPDATE is sent via the call-control channel illustrated in FIG. 2*b*. A benefit of automatically sending duplicate media streams MS 2 110 and MS 4 401 from CN 108 is that the time needed for conducting the handover can be reduced. For example, the SIP Re-Invite message normally would be passed through the call-control channel, which may require processing on multiple intermediate servers and slow the handover process.

Alternatively, a handover message could be inserted within MS 3 302 or MS 1 109, informing CN 108 to initiate transmission of MS 4 401. If the handover message (i) is inserted within MS 3 302 or MS 1 109 and (ii) can be properly processed by CN 108, this would require CN 108 to monitor IP:port 122 for both media and call control. The mixing of media and call control on the same port may not be readily implemented with present, unmodified versions of standard protocols such as such as SIP, XMPP, MGCP, or H.323, and may not be preferred with current releases of those standards. However, the standards could be modified to allow the transmission of a call-control message within media streams, thus speeding and simplifying a handover process. The mixing of media and call control within the same pair of UDP ports may be more readily implemented with (i) a proprietary protocol such as Skype®, (ii) IAX2 capable clients and hosts, or (iii) similar protocols which providing mixing of call-control messages and media within the same stream of UDP or TCP packets.

According to a second exemplary embodiment, after MD 101 begins transmitting MS 3 302, MD 101 then transmits a call-control message to CN 108 via a call-control channel—such as that illustrated in FIG. 2*b* and used to establish the original call that set up MS 1 109 and MS 2 110. The call-control message can (i) inform CN 108 of the handover and (ii) instruct CN 108 to begin transmitting MS 4 401. This call-control message could be sent by MD 101 through IP 103 or IP 301, although IP 103 is likely preferred since a call-control channel with CN 108 may have been previously set up through IP 103 in order to establish the media session illustrated in system 100.

Assuming IP 103 retains a sufficient quality network connection, sending call control through IP 103 would likely be faster than (i) attempting to set up a new call-control channel via IP 301 and then (ii) processing the call-control message via IP 301. The call-control message may inform CN 108 to begin transmitting media to MD 101 via IP:port 304 on AN NAT 119, if present. The handover call-control message could be implemented within existing protocols such as SIP, XMPP, IAX2, or Skype®, or extensions to these or other protocols could be implemented to handle the request for a new media stream MS 4 401 to be directed to IP:port 304 while CN 108 continues to receive MS 3 302 at IP:port 122. CN 108 may keep IP:port 122 as its receive port for MS 3 302 in order to avoid negotiating new port bindings between MD 101 and AN NAT 119.

Preferably, the handover for media from CN 108 to MD 101 is implemented via "make before break" methods, whereby MS 4 401 and MS 2 110 can be transmitted concurrently for a period of time until the handover is complete. That is, CN 108 could begin transmitting MS 4 before CN 108 stops transmitting MS 2 110. CN 108 should preferably transmit MS 4 401 to the port observed as the originating IP:port for MS 3 302, which is illustrated as IP:port 304 in system 400. If the CN 108 implements standards which (i) do not support "make before break" methods and (ii) only support the equivalent of call-transfer or media-redirect methods, then MS 4 401 can be set up effectively at the same time that MS 2 110 is torn down, representing a "break before make" handover for media from the CN 108 to MD 101 at IP 301.

For example, if the SIP protocol is implemented on a legacy gateway to the PSTN at CN 108, the call-control signal from MD 101 could be a SIP Re-Invite or SIP UPDATE message or similar messages indicating a change in the destination IP:port for media transmitted from CN 108. Transmitting duplicate media streams to two different IP addresses may not be deployed with many presently-installed SIP implementations. Even if "break before make" methods are implemented for the setup of MS 4 401, media packets should not be dropped because MD 101 can monitor—perhaps concurrently—both IP:port 114 and IP:port 303 for the receipt of media transmitted by CN 108.

"Monitoring concurrently" may refer to (i) a software program 204 or a software routine within MD 101, (ii) the operating system 203, or (iii) a device driver 202, and/or (iv) hardware within MD 101 operating with sufficient speed such that both IP:port 114 and IP:port 303 are each polled for receipt of a media packet on a sufficiently short time scale, such as less than every 200 ms. Thus, although IP:port 114 and IP:port 303 may be polled at separate points in time on the timescale of a computing device's operating system, such as an amount of time on the order of microseconds, the net effect of the rapid switching time is that the ports are monitored concurrently and packets are not dropped.

For example, if several packets in a row are dropped in MS 4 401 due to poor network conditions, but not dropped in MS 2 110, a process operating on MD 101 can switch between IP:port 114 and IP:port 303 with sufficient speed such that all packets are acquired and media is played out to a user without significant gaps or delay. One objective of either (i) monitoring concurrently IP:port 114 and IP:port 303 or (ii) monitoring both IP:port 114 and IP:port 303 could be to reduce possible distortions or gaps in audio or video observed by a user.

5. FIG. 5

Figure 5:
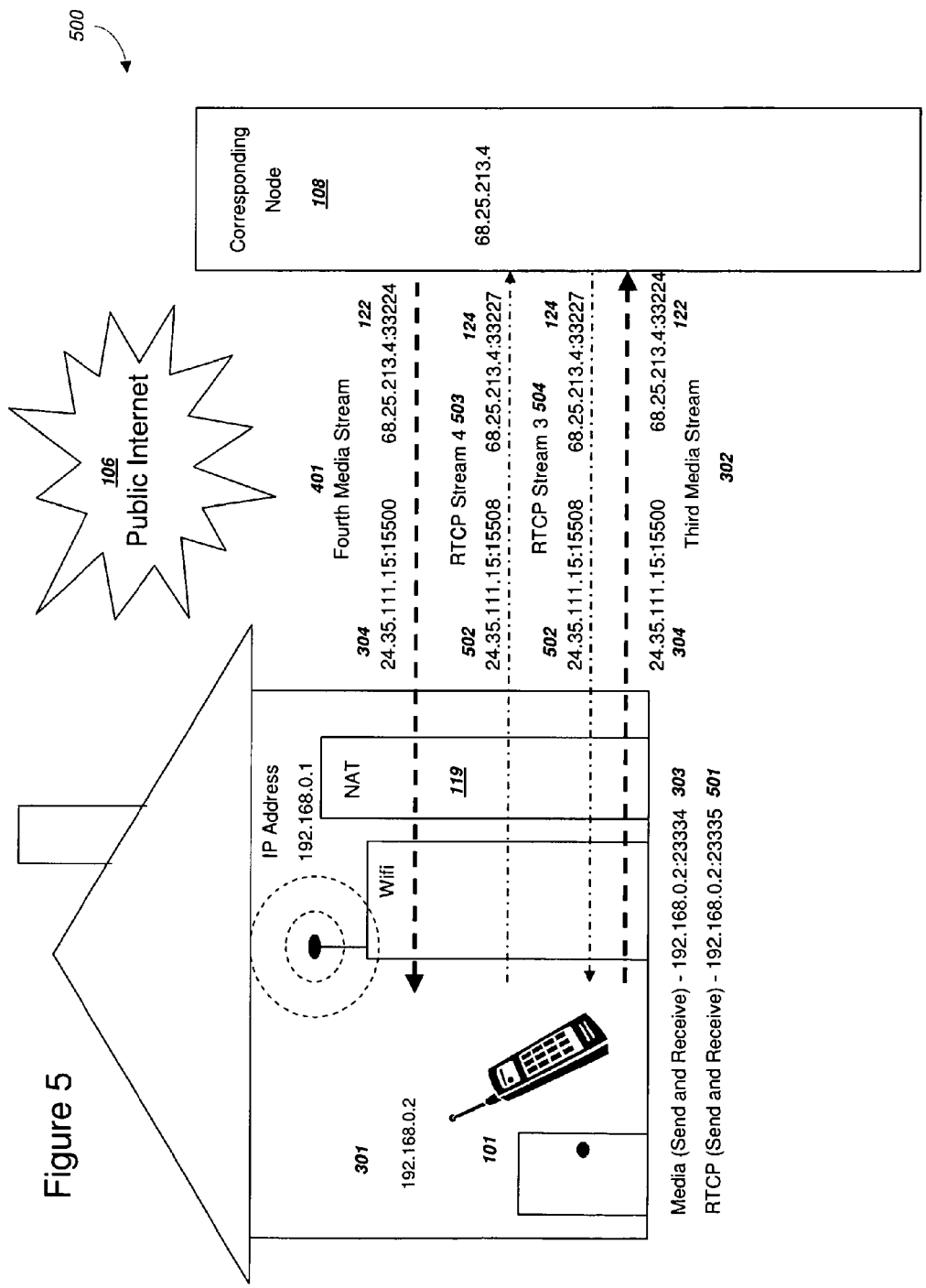
FIG. 5 is a graphical illustration of an exemplary system where the mobile device and corresponding node transmit and receive media and a media control channel upon completion of a handover according to an exemplary embodiment.

FIG. 5 is a graphical illustration of an exemplary system where the mobile device and corresponding node transmit and receive media upon completion of a handover according to an exemplary embodiment. In system 500 illustrated in FIG. 5, CN 108 transmits MS 4 401 to IP 301 using IP:port 304 as the destination port in the packets transmitted. This facilitates the media being properly forwarded to MD 101 listening on the IP:port 303, since the AN NAT 119 would generally otherwise drop packets on ports not previously opened by MD 101 and properly bound by AN NAT 119. Alternative techniques to establish a different IP:port 304 on AN NAT 119 for CN 108 to transmit media to MD 101 at IP 301 may both take time and also may not be readily discernable in any case, such as if AN NAT 119 is a symmetric NAT and CN 108 is also behind a symmetric NAT. If the subscriber's premises at the alternate network 117 are a corporate office building or other LAN with higher security requirements than a consumer DSL environment, the AN NAT 119 could well be symmetric, though it could also be so in other contexts.

Voice activity detection (VAD) may preferably be disabled within MS 3 302 in order to keep IP:port 304 open and bound on AN NAT 119. For example, if the G.729a codec is implemented by MD 101 and the user is silent for an extended period such as 120 seconds, AN NAT 119 may close IP:port 304 to inbound packets on the external interface since a timeout period on the port bindings may expire. Consequently, MD 101 should periodically send packets from IP:port 303 in order to keep IP:port 304 open and bound, even if media is not present, perhaps (i) sending a packet from IP:port 303 at an interval of every 30 seconds or (ii) sending media packets with silence descriptor frames.

MD 101 may also wish to establish a new media control channel with the CN 108 after MS 3 and MS 4 are established. As discussed previously, a media control channel allows a transmitting endpoint to evaluate the quality of media received at the receiving endpoint and subsequently make adjustments for transmitted media in attempt to improve the quality received. A media control channel can be useful for both MD 101 and CN 108 to determine that the handover is complete and successful before terminating MS 1 or MS 2, respectively. For example, during a handover period where all four media streams are transmitted concurrently, both MD 101 and CN 108 may prefer to receive feedback from the receiving node that the new media streams MS 3 and MS 4 are properly being received with sufficient quality.

Without a media control channel, there may not be a feedback mechanism to message a transmitting node about the quality of media received. For example, MD 101 may have projected that IP 301 would be preferred for communication, but the underlying network performance could suddenly change, perhaps due to unexpected congestion on the internal LAN within alternate network 117, immediately after handover had been initiated.

In general, MD 101 and CN 108 could programmatically decide to terminate MS 1 and MS 2 and complete the handover based on feedback from a media control channel such as RTCP, SCTP, or proprietary methods, among other options. MS 1 109 and MS 2 110 may be terminated after quality data in a media control channel confirms that the quality of MS 3 302 and MS 4 401 meets acceptable thresholds. Further, decisions on terminating MS 1 109 and MS 2 110 could be made independently.

System 500 in FIG. 5 illustrates the transmission of the media control channel as RTCP, although other techniques such as SRTCP or proprietary protocols could be implemented. In addition, media control channel could optionally be included as periodic messages transmitted within the media stream, which is implemented in the IAX2 protocol, for example. The benefit of mixing media and media control within the same UDP stream is that fewer NAT ports have to remain bound and open for communication. Further, the implementation of a media control channel could be omitted. Upon receipt of MS 4 401, MD 101 may begin evaluating the quality of the media and can prepare an RTCP receiver report for transmission to CN 108. MD 101 may use the next highest UDP port from IP:port 303 to transmit the RTCP report, which is shown as IP:port 501. Other ports for the media control channel at MD 101 may be used as well.

As illustrated with system 300, MD 101 may have previously evaluated that CN 108 has an address that is fully routable on the public Internet, which would be common if CN 108 is (i) a gateway to the PSTN or (ii) operates as a relay for communication with a terminating node. MD 101 should be able to transmit RTCP messages to CN 108 at IP:port 124, since that IP:port was implemented by CN 108 to receive RTCP reports for media stream 2 110 as illustrated in system 100. Consequently, MD 101 can establish a new media control channel by sending RTCP reports for MS 4 401 from IP:port 501 to IP:port 124, and during this process AN NAT 119 can create a new external port binding IP:port 502.

The new media control channel for MS 4 is illustrated as RTCP stream 4 503 in FIG. 5. Since MD 101 may be located behind AN NAT 119, CN 108 may not be able to readily transmit an RTCP report for MS 3 302 until CN 108 can determine the proper port on AN NAT 119 that would forward packets to MD 101 at IP:port 501. Upon receipt of RTCP stream 4 503 at CN 108, the corresponding node can observe the originating IP:port 502 within the IP headers of the RTCP report packet. Consequently, CN 108 may now begin transmitting RTCP reports for MS 3 302 to IP:port 502 on AN NAT 119, thereby creating RTCP stream 3 504. AN NAT 119 forwards packets in RTCP stream 3 504 to IP:port 501 on MD 101 at IP 301.

Thus, in order to effectively support a media control channel through AN NAT 119, MD 101 may implement the same IP:port for both sending and receiving media control packets, as shown by IP:port 501. In addition, in order to reduce the time required to receive RTCP Stream 3 504, MD 101 may transmit a port-binding packet either before (i) receiving MS 4 401 or (ii) preparing a quality report for MS 4 401, in order to properly open and bind IP:port 502 for the receipt of media control channel packets. The port-binding packet could be a TCP or UDP packet transmitted from IP:port 501 by MD 101 to IP:port 124 on CN 108. For example, although a full RTCP receiver report for MS 4 401 may not be available immediately upon handover and may normally be processed over an interval such as every 30 seconds, MD 101 could preferably receive RTCP receiver reports from CN 108 for MS 3 302 before the RTCP receiver report for MS 4 401 is available. However, in order to receive RTCP receiver reports from CN 108 for MS 3 302, IP:port 502 should be opened, and thus MD 101 could transmit a port-binding packet.

Other benefits can be achieved by implementing the same IP:port 501 on MD 101 for both sending and receiving the media-control-channel messages, in addition to simplifying the NAT traversal for media-control-channel messages. If (i) a separate port is implemented for transmitting and receiving media-control-channel messages at each node, and (ii) sender reports are not implemented or transmitted less frequently (such as every 120 seconds), the AN NAT 119 IP:port 502 may close due to lack of outbound traffic from MD 101 sent from IP:port 501. Through transmitting RTCP receiver reports from MD 101 via RTCP stream 4 503, as illustrated by system 500 in FIG. 5, on a periodic basis (such as every 30 seconds), the inbound IP:port 502 should remain properly active and bound, thereby allowing CN 108 to continue sending RTCP messages to MD 101 for the duration of the media session after handover started. Although generally not standardized, many common NATs will close inbound UDP ports if outbound packets have not been received in the previous 60 seconds.

When MD 101 determines that handover is complete, it may send a call-control signal via a system such as that depicted in FIG. 2b to the CN 108 to terminate MS 2 and the corresponding media control channel, if implemented. MD 101 may also then terminate MS 1 and a related media control channel RTCP 1, if implemented. The completion of the handover could also be signaled by the corresponding node. In addition, the signal to stop transmitting MS 1 and MS 2 could be a logical signal as opposed to the transmission of an explicit call-control message. An example of a logical signal could be the transpiring of a period of time where the new media streams have been transmitted concurrently with sufficient quality, such as 45 seconds.

Note that the call-control channel implemented through the system depicted in FIG. 2b that established the initial media session illustrated in system 100 may need to be transferred from IP 103 to IP 301, and many methods are available to those of ordinary skill in the art. The transfer of a call-control channel to terminate MS 1 or MS 2 may be less time-sensitive than messages or signals to indicate the handover of media. A delay of several hundred milliseconds or more due to call-control processing to terminate MS 1 109 and MS 2 110 would likely not be noticeable to an end user, while a delay or gap of a few hundred milliseconds or more in audio would likely be noticeable and should be avoided. In addition, MD 101 and CN 108 could continue to transmit either MS 1 109 or MS 2 110 for the entire duration of MS 3 302 and MS 4 401, waiting until the user is finished with the entire media session before any individual media stream is terminated.

6. FIG. 6

Figure 6:
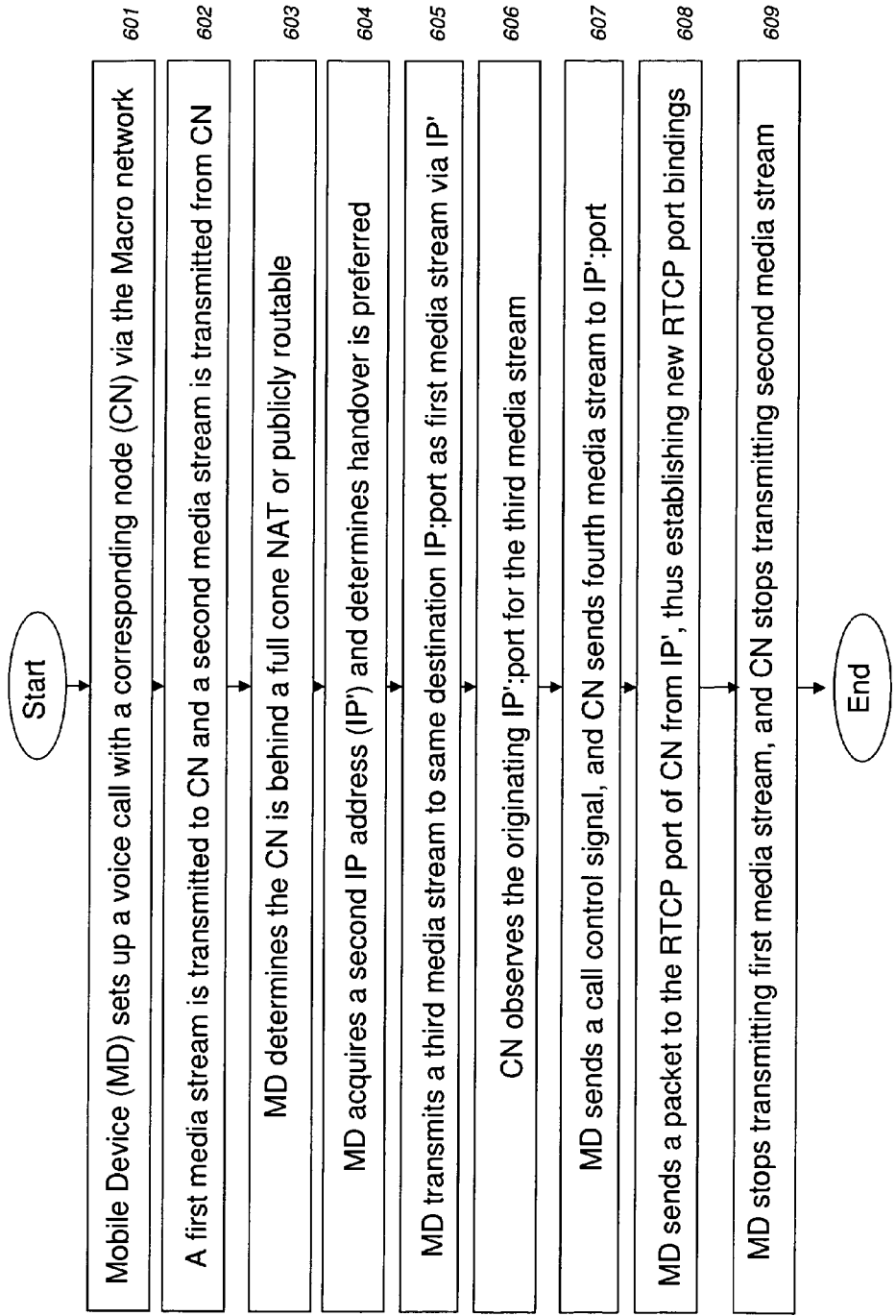
FIG. 6 is a simplified flow chart for exemplary handover procedures according to an exemplary embodiment.

FIG. 6 is a simplified flow chart for exemplary handover procedures according to an exemplary embodiment. In FIG. 6 and other flow charts describing the present invention, the processes and operations of the handover method described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer-implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel with other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

In FIG. 6, at Step 601, MD 101 establishes a media session such as a voice call with a CN 108, utilizing a first IP address such as an IP address provided by a mobile network operator. The media session could be established through call-control messages such as SIP INVITE, IAX2 NEW, XMPP Request, or other similar messages according to a protocol implemented by MD 101. In addition, MD 101 and CN 108 may not implement the same call-control protocol, and an intermediate server may translate the call-control messages between the two nodes. Although a request for a media session is described as originating from MD 101, a request to initialize a session could be requested from the corresponding node, representing an incoming call to the mobile device. Further, the voice call illustrated in FIG. 6 at Step 601 could initially be set up via a local network such as WiFi.

As shown in Step 602, upon establishment of the media session, a first media stream MS 1 109 is transmitted from MD 101 to CN 108, and a second media stream MS 2 110 transmitted from CN 108 to MD 101. The media session may optionally include a separate media control channel or protocol, such as RTCP or SRTCP, or the media control channel could possibly be imbedded directly into the media stream, as with IAX2. Preferably, quality feedback is provided by RTCP, SRTCP, similar protocols, or media control packets inserted into the media stream to (i) monitor the quality of received media received at another node and (ii) allow adjustments such as changing a codec, implementing forward error correction, or taking other steps to attempt to improve call quality.

At Step 603, the mobile device 101 evaluates whether the corresponding node 108 has an IP address that is (i) publicly routable or (ii) behind a full cone NAT. CN 108 would likely be publicly routable if it is (i) a relay to communicate with a terminating node, (ii) a gateway to the PSTN, (iii) an application layer gateway similar to MN NAT 105 illustrated in system 100, or (iv) a home agent (HA) within the Mobile IP specification (IETF RFC 3344, which is hereby incorporated herein by reference, and related standards), among other publicly-routable possibilities.

CN 108 may be behind a full cone NAT if CN 108 is a peer-to-peer client operating on a computer behind a consumer broadband connection, for example, since many consumer NATs are the full cone type. CN 108 may be behind a symmetric NAT or a port restricted cone NAT if it operates within a corporate LAN, for example, and other combinations of NAT types and alternate networks are possible as well. MD 101 may not be able to determine if CN 108 is publicly routable or behind a full-cone NAT directly, but rather could query CN 108 or a server on the internet with a stored profile for CN 108, such as server 214. Further, Step 603 could be determined before step 602, such as when the initial media session was requested in Step 601. In this case, a NAT profile of CN 108 could be stored in memory on MD 101 during Step 601 and then retrieved from memory during later handover procedures such as at Step 603.

At Step 604, the mobile device acquires a second IP address, such as IP 301 and determines that handover of the active media session to the new IP address is preferred. One of many example possible parameters to determine whether handover is preferred include whether handover will reduce consumption of network resources for the mobile network 102, or alternatively if call quality will be improved. Further, a software program or a communications service operating on MD 101 could simply determine that establishing a duplicate media path via IP 301 is desirable regardless of the trends in quality, from the benefits of transmitting media through two independent communications channels (via IP 301 and IP 103), which can increase the quality received at both the corresponding node and the mobile device.

At Step 605, the mobile device 101 can begin transmitting a third media stream using IP 301, preferably to the same destination IP:port that MD 101 utilizes for the first media stream. Other destination ports could also be implemented as the destination IP:port for the third media stream, but a change in the receiving port on CN 108 would require signaling and processing overhead to negotiate the port with MD 101. By implementing standard methods available in protocols such as UDP, RTP, IAX2, or proprietary protocols with similar functionality, the duplicate media stream MS 3 302 should not degrade quality or cause other problems, and receipt of essentially duplicate media at the corresponding node could enhance call quality.

At Step 606, the CN 108 may begin receiving MS 3 and can monitor the originating IP:port 304 as the source IP:port within the packets of the media stream. The duplicate media streams MS 1 and MS 3 may be useful for CN 108 to maintain audio quality if the quality of MS 1 degrades while the handset moves away from base station 104 or into a location of reduced coverage or lower signal-to-noise ratios, such as movement into a building, or in other scenarios. If packets are dropped or contain errors in MS 1, CN 108 may compensate for the errors by substituting the media in MS 3.

At Step 607, the corresponding node begins transmitting a duplicate media stream MS 4 to the mobile device, preferably utilizing IP:port 122 as the originating port and sending the traffic to IP:port 304 on the AN NAT 119. Thus, MD 101 should receive MS 4 without requiring the negotiation of additional or new ports on both the AN NAT 119 and CN 108. MD 101 preferably monitors IP:ports 303 and 114 concurrently for the receipt of both MS 2 and MS 4. Again, the duplicate media streams MS 2 and MS 4 may be useful for MD 101 to maintain audio quality if communication through IP 103 begins to deteriorate, and the packets from MS 4 can compensate for potential loss or errors within MS 2.

The initiation of MS 4 could be programmed on the CN 108 to be automatic if the CN 108 observes the receipt of duplicate media at IP:port 122, or MS 4 could be initiated through a call-control signal transmitted via the call-control channel illustrated in FIG. 2b. The receipt of essentially duplicate media at IP:port 122 can also function as the call-control signal, and in this case the call-control signal is logical as opposed to a separate packet or call-control message. If CN 108 implements a legacy protocol and cannot transmit the duplicate MS 2 and MS 4 concurrently, then MS 4 could be initiated as soon as feasible after MS 2 is terminated, and preferably within 50 ms or receipt of a call-control message indicating handover.

At Step 608, the MD 101 may optionally establish a media control channel such as RTCP or similar protocols for the new MS 4 that MD 101 receives. Reports on quality, such as a RTCP receiver reports, may be sent back to the CN 108 at IP:port 124. By sending a packet to this IP:port 124 from IP:port 501, MD 101 can open and bind a new port on AN NAT 119, whereby CN 108 can subsequently send media control channel packets back to MD 101 for MS 3 at IP:port 502. CN 108 may need to change its originating port for media control channel packets to the port number where it receives media control channel packets, in order to support possible symmetric NAT or port restricted cone functionality on AN NAT 119. The media control channel process illustrated in Step 608 may be omitted, although it could be useful for MD 101 and CN 108 to monitor quality of the new media streams.

At Step 609, the handover is completed and MD 101 may stop transmitting MS 1, CN 108 may stop transmitting MS 2, and the associated media control channels, if implemented, may be closed. The signaling to terminate MS 1 and MS 2 could be sent through the call-control channel illustrated in FIG. 2b, or via a call control packet inserted in the media streams. Step 609 may be optionally omitted, such that MS 1 and MS 2 will continue for the duration of the user's media session.

7. FIG. 7

Figure 7:
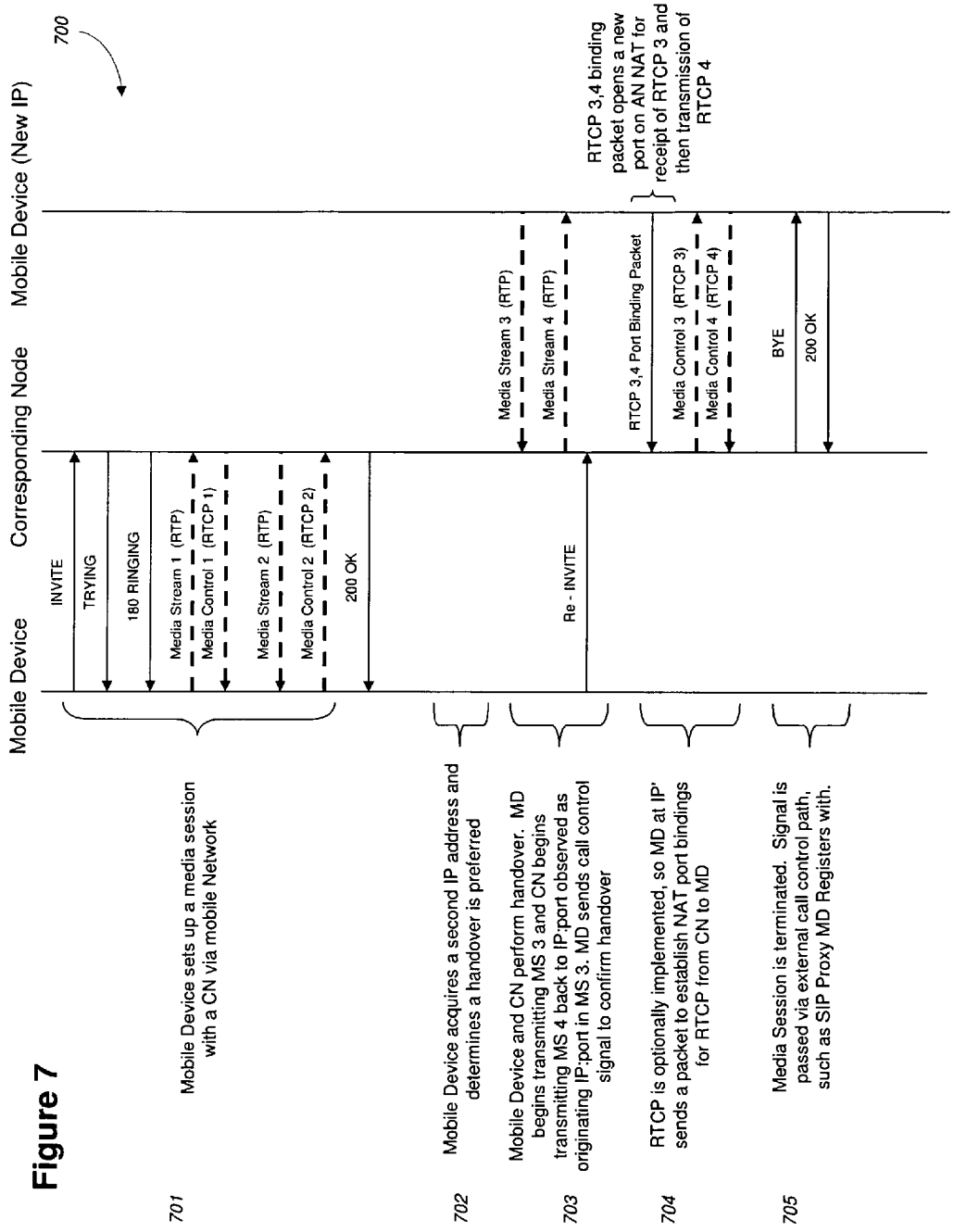
FIG. 7 is a simplified message flow diagram illustrating the handover call-control messages and media flow between the mobile device and corresponding node according to an exemplary embodiment.

FIG. 7 is a simplified message flow diagram illustrating the handover call-control messages and media flow between the mobile device and corresponding node according to an exemplary embodiment. The protocol illustrated in 700 is according to common, current implementations of the SIP protocol, but many protocols that can establish media sessions between endpoints on the Internet could be used.

At Step 701, the mobile device and corresponding node establish a media session according to methods that are well known in the art. Note that MD 101 may begin transmitting media, media stream 1, before "200 OK" or equivalent, since MD 101 may be behind a mobile network NAT (MN NAT) 105. The NAT ports for receipt of audio information in media stream 2, such as ringing tones or busy tones, may not be possible until an external NAT port on MN NAT 105 is opened. Alternatively, an application layer gateway on MN NAT 105 could properly negotiate and open the ports. Although media is shown as RTP in Step 701, media could be transmitted according to other protocols.

At Step 702, the MD 101 acquires a second IP address and determines that handover is preferred. The acquisition of the second IP address and the handover decision may be handled at different program levels within the mobile device. For example, the mobile device operating system 203 may manage the acquisition of a second IP address, while a software application or software module may determine that handover is preferred. For example, a software routine that is running within the operating system 203 may determine that handover is preferred. Another example is a program such as Truephone® or MSN Messenger® could monitor the quality of an existing media session and could observe the second IP address, IP 301, and measure the quality of the second IP address to make decisions regarding handover.

At Step 703, the mobile device begins handover. The mobile device may transmit media stream 3 to the corresponding node. The destination IP:port for MS 3 302 is preferably the same IP:port the MD 101 implements for MS 1 109, which is IP:port 122 as illustrated by system 300 in FIG. 3. Other destination ports could be used, which would likely require additional signaling between MD 101 and CN 108. Upon receipt of MS 3 by the CN 108 at IP:port 122 from the alternate network 117, the CN 108 begins transmitting MS 4 to the mobile device, preferably to the IP:port 304 observed by CN 108 as the originating or source IP:port for MS 3.

Note that an AN NAT 119 may not be present, in which case IP:port 304 and IP:port 303 could be the same. Again, other ports could be used as the destination IP:port for MS 4 as transmitted by CN 108, but that may require opening the ports on the AN NAT 119, if present, and negotiating the change in ports between MD 101 and CN 108. MD 101 may monitor IP:port 303 for the receipt of MS 4, preferably while continuing to receive MS 2 on IP:port 114. MD 101 may also send a call-control signal to CN 108 to indicate that handover is requested, such as through a SIP Re-INVITE message via the call-control channel illustrated in FIG. 2b.

At Step 704, a media control protocol such as RTCP may be used, in which case MD 101 may send a packet to IP:port 124 from IP:port 501 to open and set the AN NAT 119 port 502. Note that (i) a packet can be sent simply to open the port (i.e., an actual complete RTCP receiver report or similar media control message is not required) and (ii) actual media control messages can be transmitted later in the handover.

The packet sent from IP:port 501 to IP:port 124 in order to open and bind IP:port 502 on AN NAT 119 may be referred to as a port-binding packet. Opening AN NAT 119 port 502 early in the handover process may be preferred, such as within a few seconds of the start of transmission of media stream 3, since utilizing the media control channel to evaluate quality could be helpful for determining when the handover is successful. Also, opening AN NAT IP:port 502 early in the handover process, such as before an RTCP receiver report is available for MS 4 401 allows CN 108 to transmit a RTCP receiver report to IP:port 502, which is forwarded to IP:port 501, providing MD 101 feedback on the quality of MS 3 302 received by CN 108.

When both MD 101 and CN 108 acquire sufficient data for reporting the quality of media streams 4 and media streams 3, respectively, report messages on quality such as RTCP or SRTCP receiver report messages may be transmitted and received on (i) MD 101 at IP:port 501 via IP:port 502 on the AN NAT 119 and (ii) CN 108 at IP:port 124. Other RTCP ports may be used, which would require proper negotiation between MD 101 and CN 108, as well as properly binding ports on AN NAT 119, if present.

At Step 705, after the handover is completed and the users have finished the media session, the MD 101 may terminate the call and end MS 3 and MS 4, via standard methods such as a "BYE" with SIP or similar messages in related protocols. 8a. FIG. 8a

FIG. 8a is a simplified tabular summary illustrating packet received timings and jitter-buffer settings during handover for a mobile device according to an exemplary preferred embodiment. As discussed previously, the corresponding node may implement legacy software or standards and be unable to transmit dual media streams to MD 101. One example may be if the corresponding node is an analog telephone adapter that was commonly deployed before 2008. Another example could be if the corresponding node was a Cisco AS-5530 gateway with an operating system of IOS 12.3.

Both of these example corresponding nodes may implement the SIP protocol, but may not support the change in IP address for MD 101 in a manner that includes the transmission of duplicate media streams. In this instance, the MD 101 could issue a SIP Re-Invite or similar messages to change the destination IP address for media transmitted from the CN 108. This can establish the new media stream 4. However, if legacy standards are implemented, MS 2 would likely be terminated at the same time MS 4 is initiated, resulting in a possible temporary increase in packet delay during the transition. An illustration of this delay and a recommended example solution is illustrated in FIG. 8a.

The Source IP 801 in FIG. 8a shows an example source IP address and port number for media packets received at MD 101. The Destination IP 802 in FIG. 8a shows an example destination IP address and port number for media packets received at MD 101. The Packet Receipt Time 803 shows an example time increment when MD 101 receives each media packet. In this illustration, the media is transmitted according to a codec with 20 ms frames, such as GSM-EFR, AMR, standard G729.b frames, iLBC with 20 ms frames, or G.711 transmitted at 50 packets per second. The "Time Since Receipt of Previous Packet" 804 illustrates in milliseconds the delay and variation in delay from the underlying packet switched network.

With a high-quality, managed network planned for next generation, IP-based mobile networks such as WiMax or LTE, the jitter should remain relatively low under normal circumstances. One common measure of jitter is the standard deviation of packet arrival time, which is also shown as Jitter 805 in FIG. 8a. For example, during the last 15 packets received by MD 101 and transmitted by CN 108 via the mobile network 102 and within MS 2 110, the jitter is approximately 6.8 milliseconds.

A jitter buffer is commonly used with VoIP applications in order to smooth the playout of media and avoid dropping incoming packets due to unevenly spaced packet arrival times. Under normal circumstances, a jitter-buffer size of 60 ms should be sufficient to handle network jitter of 6.8 ms, as illustrated in the "Default Jitter Buffer Size" 806 column. Also, note that reducing a jitter buffer is generally preferred, by reducing delay for observed speech or transmitted media. However, the tradeoff for reducing the jitter buffer is that packets could be dropped if they arrive outside of the jitter-buffer window.

As shown in FIG. 8a and highlighted in bold, applying the default jitter-buffer size of 60 ms may result in lost packets during the handover with receipt of the first media packet after handover being at time 13:23:54.668. Note the example significant increase in delay for the first packet received represents a "break before make" handover implemented for media transmitted by the corresponding node. The delay profile for packets received will likely change upon handover, as the media packets take a new route through the Internet. In addition, there is some overhead processing time required on CN 108 to (i) process the SIP Re-Invite or equivalent message in a different protocol and (ii) change the routing of outbound packets from MS 2 to MS 4 during a "break before make" handover.

The example delay for packets received may have a significant spike for the first packet received at IP 301, as illustrated at time 13:23:54.668. The example packet delay shown falls outside the default jitter-buffer window illustrated in the "Default Jitter Buffer Size" 806 column, so the packet highlighted in bold would be dropped. In fact, more than one packet may be dropped immediately after handover in the example shown in FIG. 8a, as the jitter buffer attempts to rapidly expand and address the significantly different jitter profile that results from the new routing of inbound media packets to MD 101.

According to a preferred embodiment of the present invention, the jitter-buffer size in the MD 101 can be increased gradually before transmission of a SIP Re-Invite or similar handover call-control message or signal, in order to address a possible temporary increase in jitter for received media packets upon handover. The function of a "handover predicting jitter buffer" 222 is illustrated in the "Handover Predicting Jitter Buffer" column 807. With a handover-predicting jitter buffer 222, a software routine may increase the size of the jitter buffer before handover, and decrease the size of the jitter buffer after handover.

The rate of increase and then decrease in the jitter-buffer size or the playback of media from the jitter buffer could be sufficiently small to avoid significant distortion of audio or video playback to users. Although an example step is shown in FIG. 8*a* of adjusting the jitter buffer by 5 ms for approximately every 20 ms of audio received, the adjustment could be a smaller step such as 2-3 ms for every 20 ms of audio received. In addition, the step function of increases in increments of 5 ms shown in column 807 could represent the gradual lengthening of playback of media to a user, while the handover-predicting jitter buffer could implement a larger increase in the actual buffer size. During stable periods before and after the handover, the handover-predicting jitter buffer 222 size could match a "Default Jitter Buffer Size" 806, such as 60 ms before handover and 80 ms after handover as illustrated. Other default jitter-buffer sizes could be used, depending upon the jitter profile of packets received before and after handover.

A handover-predicting jitter buffer can smooth the playback of audio if the jitter profile suddenly changes upon handover. For example, if the corresponding node 108 is a gateway to the Public Switched Telephone Network (PSTN) that implements the SIP protocol, such as a Cisco AS-5400 or similar gateway, a SIP Re-Invite command from MD 101 typically will need to be issued to direct the gateway to establish MS 4 401 while terminating MS 2 110. Since the sequence and number of hops for the media packets sent to MD 101 from the gateway will change, the jitter profile of the arriving media will also likely change and can significantly increase.

If (a) the initial media session was set up on the MN 102 and (b) the gateway, or CN 108, also resides on MN 102, the jitter may be a lower value before a handover to alternate network 117, with Internet access provided by a third party ISP. The reason is that the mobile operator may control the network and all router hops between the mobile device and the gateway through the mobile network in this example and thus can manage packet jitter and delay. When the MS 2 is switched to MS 4 and transmitted to AN NAT 119, the packets transmitted by CN 108 may traverse the public Internet and likely have additional hops to reach the ISP that provides broadband service for the AN NAT 119, resulting in additional jitter. As illustrated in FIG. 8*a*, a handover-predicting jitter buffer can increase the jitter-buffer window prior to handover to avoid distortion of the audio that would result from (i) packets being dropped by falling outside of the jitter buffer window or (ii) a rapid increase in the default jitter buffer size to compensate for the sudden, unexpected increase in jitter at handover.

Figure 8B:
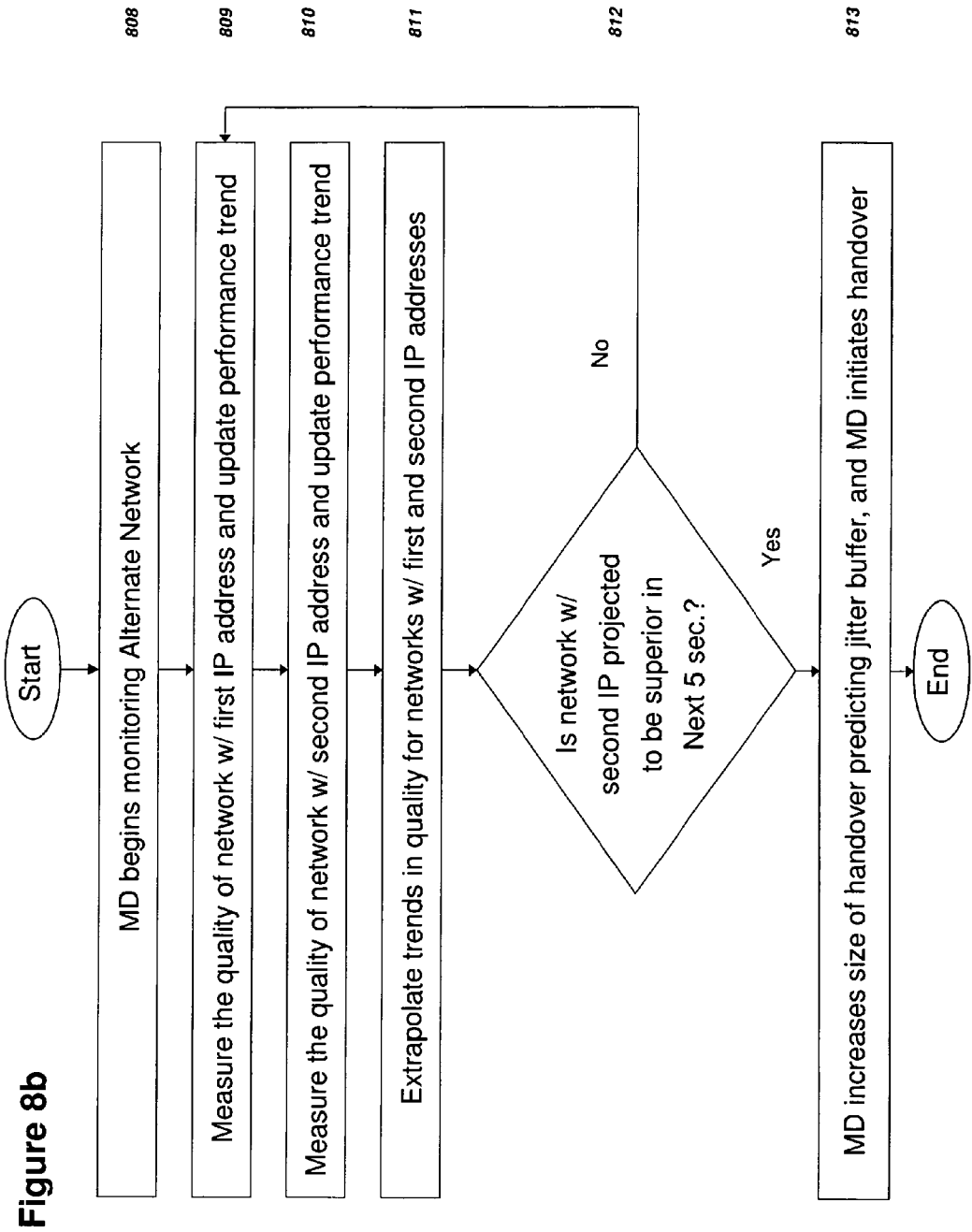
FIG. 8b is a flow chart illustrating exemplary steps for a software routine to monitor the trend in the quality of network connections and to determine that a handover is preferred.

8b. FIG. 8*b*

FIG. 8*b* is a flow chart illustrating exemplary steps for a software routine to monitor the trend in the quality of network connections and to determine whether a handover is preferred. In Step 808, MD 101 begins monitoring an alternate network such as AN 117, such as when a new network is initially detected through a physical interface 201. In Step 809, MD 101 measures the quality of the network providing services for IP 103, such as measuring signal-to-noise ratios, bit errors, packet loss, delay, etc., and MD 101 could record the measurement in memory to keep a trend of the data over time for subsequent analysis.

Similarly, MD 101 can measure the quality of the network providing services for IP 301 in Step 810 and also update memory with the new measurement. The measurements in 809 and 810 could also include evaluations of other network characteristics, such as the total bandwidth available. At Step 811, MD 101 can extrapolate trends in performance into the future for network quality on the two networks, such as predicting performance over the next 10 seconds, as one example. The extrapolation could be performed using linear regression or another regression technique that best suits the data, such as an exponential regression for example. In addition, the sequence of steps 809, 810, and 811 could be in a different order.

In Step 812, a software routine compares the predicted network performance in the future, using the extrapolated trends predicted in Step 811. The example timeframe for evaluation is illustrated is 5 seconds in the future in FIG. 8*b*, although other timeframes could be used. The timeframe in the future could also be dynamically determined based upon the rate of change in repeated measurements in Step 809 and Step 810. For example, if the network quality is observed as rapidly changing, then the timeframe to compare the two connections in the future could be smaller, such as comparing the two networks 2 seconds into the future. If the network quality is observed as being more stable, then the timeframe to compare the two connections in the future could be larger, such as comparing the two networks 15 seconds into the future.

At Step 812, if the software routine determines that the network providing services via IP 103 is preferred, no handover request is made and the network monitoring returns to Step 809 and may continue. If the software routine determines that the network providing IP 301 will be preferred in the future, such as within the next five seconds, MD 101 can begin preparing for handover. In Step 813, MD 101 may begin increasing the size of the handover-predicting jitter buffer 222, for example. Thus, the routine monitoring the performance of network connections could be coupled to the routine controlling the handover-predicting jitter buffer. Also in Step 813, the MD 101 could initiate handover by transmitting a SIP Re-Invite, a similar call-control message such as a non-media packet within MS 1, or simply begin transmitting MS 3 to signal handover to CN 108. And other possibilities exist as well for indicating initiation of handover.

The software routine illustrated in FIG. 8*b* could also be implemented in hardware, or operated by a remote server separate from MD 101. The steps outlined in FIG. 8*b* could also be applied when a mobile device has three or more available networks, where each of the networks is measured and then compared, and a preferred handover may also be predicted between the multiple different available networks.

9. FIG. 9

Figure 9:
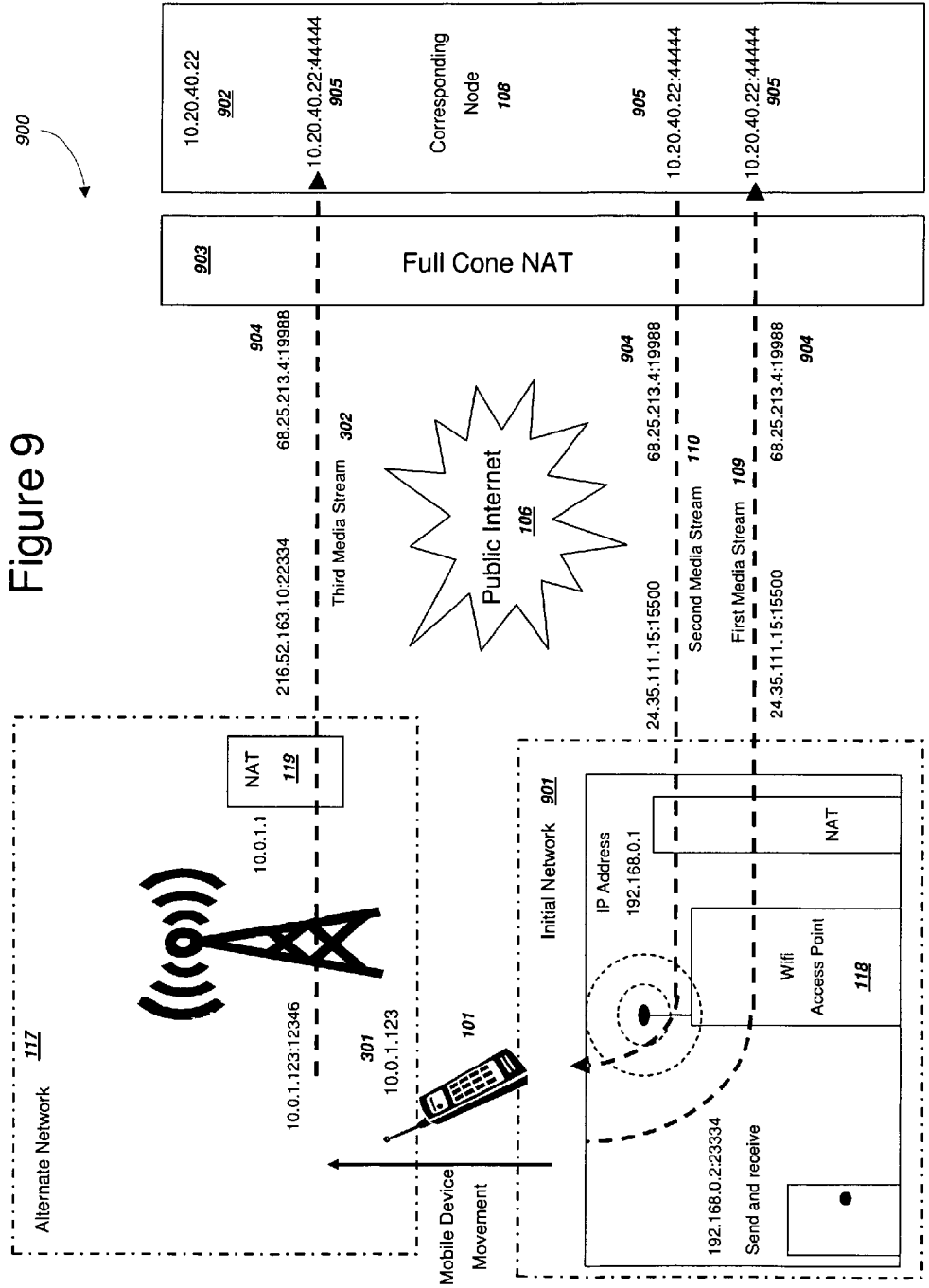
FIG. 9 is a graphical illustration of an exemplary system where the mobile device initiates handover, where the corresponding node accesses the public Internet through a full cone NAT router, according to an exemplary embodiment.

FIG. 9 is a graphical illustration of an exemplary system where the mobile device initiates handover, and the corresponding node accesses the public Internet through a full cone NAT router, according to an exemplary embodiment. For the system 900 illustrated in FIG. 9, the alternate network 117 is shown as the mobile operator's WAN, representing the target network for the handover. The initial network 901 is the network where the first media session with CN 108 was established. Alternatively, the initial network 901 could be the network to which a previously-established call has already been handed over, such as if the user was moving through several different networks during a call.

In order to obtain connectivity to the Internet through the alternate network 117, the mobile device 101 can acquire a new IP address (IP) 301 that is provided by the alternate network 117. System 100 and system 900 illustrate that the alternate network (i.e. the network that is the target of a potential or actual handover) can be of any one of a variety of network types, and in general is any network from which an endpoint—such as MD 101—would obtain a new IP address for communicating over the public Internet 106.

For example, even though the mobile network operator may refer to the mobile network 102 as the "home network", for the purposes of the efficient handover techniques of the present invention, the mobile network 102 may also be an alternate network 117, representing a target network to which a mobile device may prefer to transfer an existing media session such as a telephone call or a "peer-to-peer" voice or video communication. The example IP addresses shown in FIG. 9 within AN 117 and the Initial Network 901 are for illustration purposes and are shown as similar to the IP addresses illustrated in FIGS. 1 through 4, although the IP addresses within AN 117 and the Initial Network 901 in System 900 could be different from the IP addresses illustrated in FIGS. 1 through 4.

The corresponding node 108 may have a private IP address (CN IP) 902. The corresponding node 108 may be connected to the public Internet 106 via a full cone NAT router 903. A software program operating at the corresponding node CN 108 may determine the NAT type for NAT 903 through standard techniques such as Simple Traversal of UDP through NATs (STUN) or similar methods such as those illustrated in system 200. A port on a full cone NAT external interface, which is open and bound to an IP:port on the internal network, may generally be open to all IP addresses on the public Internet. CN 108 is not required to confirm that NAT router 903 is a full-cone NAT in order to implement the techniques illustrated herein. In addition, CN NAT 903 may perform firewall functions only and not network address translation. In this case, CN NAT 903 could be considered a full cone firewall, such that any server on the public Internet can transmit a packet to CN 108 at an IP:port where CN 108 had recently transmitted an outgoing packet.

A media session between MD 101 and CN 108 has previously been established through protocols and a system such as the system shown in FIG. 2*b*. The communication consists of a first media stream MS 1 109 transmitted from MD 101 to CN 108 and a second media stream MS 2 110 transmitted by CN 108 to MD 101. Although not illustrated in FIG. 9, a media control channel such as RTCP or STRCP may optionally be implemented, but is not required, and other quality feedback mechanisms could be utilized as well, such as inserting quality feedback messages into MS 1 or MS 2. The full cone NAT 903 maps packets transmitted and received at its external interface to the CN IP address 903 with associated ports.

MD 101 may acquire IP 301 in part due to movement. Alternatively, both IP 103 and IP 301 may be present and active on MD 101 when the media session with CN 108 was established, and MD 101 previously determined that IP 103 was preferred for communication for one or a combination of multiple reasons previously illustrated, such as superior quality, lower costs, higher bandwidth, etc. For example, physical movement of MD 101 is not necessary to leverage the advantages of implementing the present invention. MD 101 could be stationary and either (i) acquire a new IP address IP 301 as the signal from AN 117 improves, or (ii) have multiple IP addresses assigned and active, whereby MD 101 monitors the multiple IP addresses for quality and determines that a handover is preferred as the multiple network-quality profiles change.

These two cases represent a situation where the signal strength at a particular physical location is dynamic, such as due to periodic interference or other sources of variation in network quality. One possible example is if a user is located in a residence at the initial network 901 and MD 101 communicates through a local WiFi access point 118 for an existing media session, and then a family member turns on a microwave oven nearby, which could interfere heavily with 802.11 signals at 2.4 GHz. Microwave ovens typically operate at power levels of hundreds of watts close to 2.4 GHz. With (i) an active media session established and (ii) both IP 103 and IP 301 assigned and active on MD 101, MD 101 may determine that handover from IP 103 to IP 301 is preferred even though the mobile device is stationary in this example involving high, unexpected interference. This example also illustrates that rapid handover techniques are preferred and that the need for a handover may not be readily predictable by MD 101. The efficient handover techniques outlined in the present invention can provide rapid handover of media to minimize the impact on voice or video quality for the user.

To initiate handover, MD 101 preferably begins transmitting a third media stream MS 3 302 from IP 301 to CN NAT 903 at IP:port 904 when MD 101 determines that handover is preferred. CN NAT 903 subsequently receives two media streams at IP:port 904, shown in FIG. 9 as the destination IP address and port for both MS 1 109 and MS 3 302. CN NAT 903 may then forward packets in both media streams to the same port implemented by CN 108 for the receipt of MS 1 109, shown as IP:port 905.

Call-control messages from MD 101 to CN 108 may be transmitted as well in order to support or further control the handover process, although according to a preferred exemplary embodiment, MS 3 302 can be transmitted by MD 101 before a handover call-control message is transmitted by MD 101, in order to speed the handover process. MD 101 preferably performs a "make before break" handover, so MS 1 109 and MS 3 302 are transmitted concurrently. CN 108 could observe that MS 3 302 and MS 1 109 are effectively duplicate media streams. Alternatively, MD 101 may perform a "break before make" handover, and simply cease transmission of MS 1 109 when MS 3 302 is initiated, although sending duplicate media streams from MD 101 may be preferred.

CN 108 should process the duplicate media streams, or the single MS 3 302 if "break before make" handover is performed, without requiring any previous signaling, and the two streams of media received by CN 108 may not be identical copies, as each stream may have different levels of packet loss, bit errors, or jitter. Preferably, CN 108 can process both media streams in order to obtain a superior representation of the media transmitted by MD 101. For example, if CN 108 determines that a particular packet in MS 1 likely has bit errors, but that the equivalent packet in MS 3 is received without errors, then CN 108 may utilize the packet in MS 3 for media playback. Conversely, if CN 108 determines a second packet in MS 3 was lost but the equivalent packet in MS 1 was received, then CN 108 may utilize the second packet from MS 1 for media playback. Consequently, a receiving node may combine information received in two separate media streams for reasons such as reducing errors.

Further, MD 101 may implement different codecs for transmitting MS 1 and MS 3. MD 101, CN 108, or server or host on the Internet may have determined that a higher bandwith codec such as G.711 is preferred for MS 1 when MS 1 was established, due to high bandwidth availability or lower-cost bandwidth at IP 103. However, a different codec such as AMR may be preferred for communication through the alternate network 117. For example, the alternate network 117 may have lower bandwidth, more expensive bandwidth, or higher bit errors, and consequently a mobile network codec such as GSM-EFR or AMR may be preferred for MS 3 over the codec implemented for MS 1.

MD 101 and CN 108 may have shared a supported codec list when establishing the first media session using a system similar to that depicted in FIG. 2b. Consequently, MD 101 may begin transmitting MS 3 formatted in a different codec to CN NAT 903 IP:port 904 upon the initiation of handover. In this case, CN 108 preferably supports the different codec for MS 3 and processes the duplicate media streams in order to minimize potential gaps or errors in media received during handover. The media in FIG. 9 may be sent as RTP or SRTP, although other methods of sequencing the media packets transmitted could also be implemented.

10. FIG. 10

Figure 10:
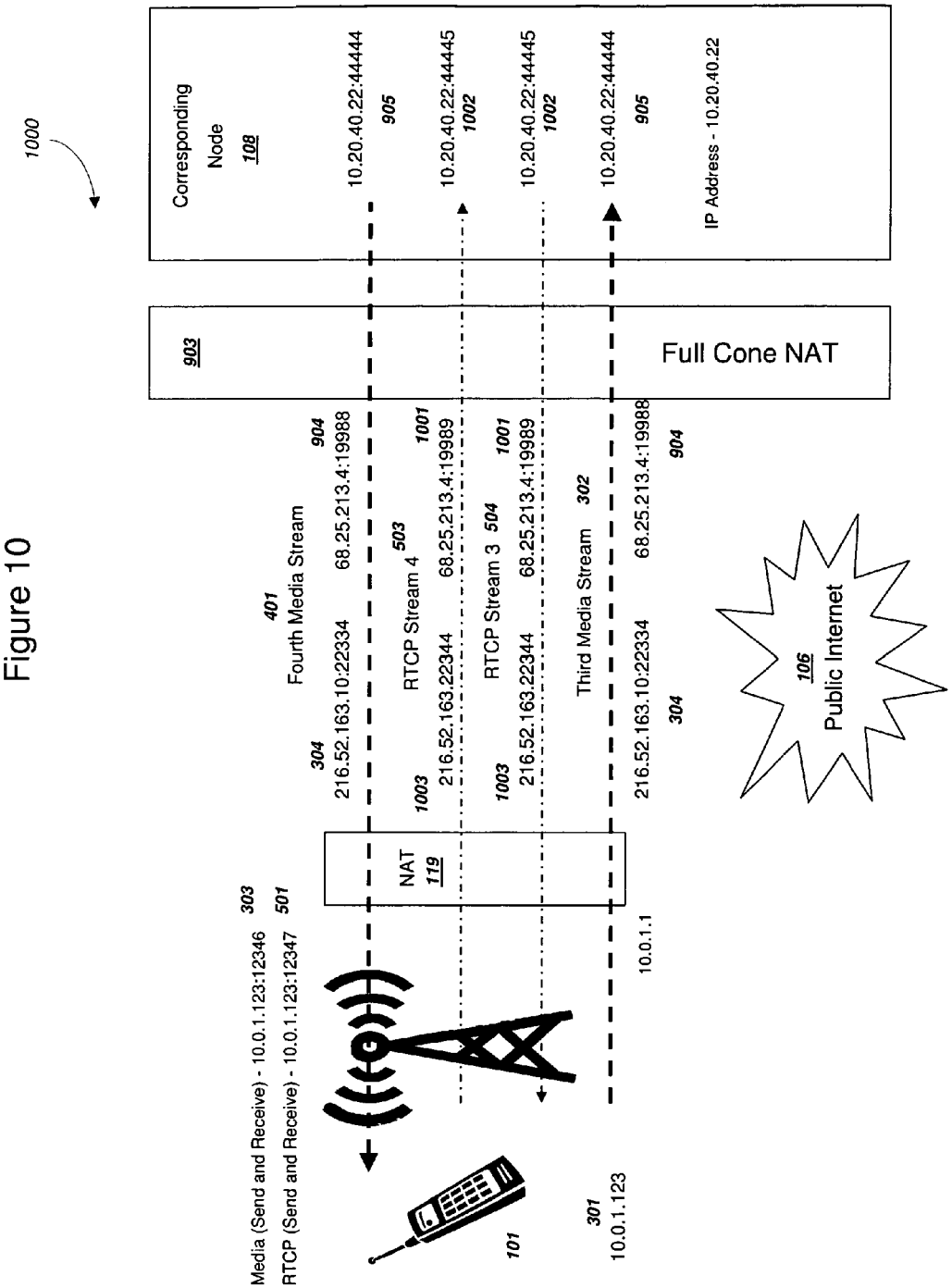
FIG. 10 is a graphical illustration of an exemplary system where the mobile device and corresponding node transmit and receive media upon completion of handover and the corresponding node connects to the Internet through a full cone NAT router, according to an exemplary embodiment.

FIG. 10 is a graphical illustration of an exemplary system where the mobile device and corresponding node transmit and receive media upon completion of handover and the corresponding node connects to the Internet through a full cone NAT router, according to an exemplary embodiment. According to a preferred exemplary embodiment illustrated in system 1000, when CN 108 receives MS 3 302 via the CN NAT 903, CN 108 may begin transmitting a fourth media stream MS 4 401. In addition, CN NAT 903 may be a firewall and not perform network address translation functions. For example, if IPv6 is implemented then the need for network address translation is significantly reduced due to the availability of a large number of routable addresses. However, a user or an ISP managing the Internet connectivity for CN 108 may desire the security benefits of a NAT, and thus restrict incoming packets on a particular IP:port until outgoing packets have first been transmitted. Thus, CN NAT 903 may be a firewall instead of a NAT.

According to a second exemplary embodiment, CN 180 can begin transmitting MS 4 401 upon the receipt of a call-control signal, which may consist of (i) a SIP Re-Invite, (ii) a call-control message inserted into media stream 1 109 or MS 3 302, or (iii) changes in the UDP checksums for packets in MS 1 109, among other options.

CN 108 observes that the source IP address for MS 3 302 is IP:port 304, representing the external port on AN NAT 119 that binds to MD 101 IP:port 303. CN 108 preferably transmits MS 4 401 to AN NAT 119 IP:port 304 using as a source IP:port the same IP:port used to receive MS 3 302, which is IP:port 905. One benefit of transmitting MS 4 401 packets from CN 108 from the same IP:port at which CN 108 receives MS 3 302 is that AN NAT 119 may be symmetric or a port-restricted cone NAT.

According to a preferred exemplary embodiment, CN 108 may begin transmitting MS 4 401 without a handover call-control message or explicit call-control signal from MD 101. CN 108 can observe the duplicate media streams MS 1 109 and MS 3 302, where media is transmitted from MD 101 with different source IP addresses. The receipt of duplicate media streams may signal to CN 108 that MD 101 is initiating handover and has a new preferred IP address. Additionally, after MD 101 begins transmitting MS 3 302, MD 101 may then transmit a call-handover message to CN 108 via a call-control channel such as the one illustrated in FIG. 2b. This call-handover message could be sent by MD 101 from one or both of IP 103 and IP 301.

Preferably, the transfer of media from CN 108 to MD 101 at IP 301 is implemented via "make before break" methods, whereby MS 4 401 and MS 2 110 could be transmitted concurrently for a period of time until the handover is complete. That is, CN 108 can start transmitting media stream 4 401 before stopping transmission of media stream 2 110. CN 108 may preferably transmit MS 4 401 to the IP:port observed as the originating IP:port for MS 3 302, which is illustrated as IP:port 304 in system 1000. MD 101 may monitor both IP:port 114 and IP:port 303 concurrently for the receipt of media from CN 108, after the start of transmission of MS 3 by MD 101.

In system 1000 illustrated in FIG. 10, CN 108 can transmit MS 4 401 to AN NAT 119 with the destination IP:port 304 from the source IP:port 905, which is also used by CN 108 for the receipt of packets in MS 3 302 and also MS 1 109. This allows MS 4 401 to traverse both AN NAT 119 and CN NAT 903 without opening, determining, and communicating new ports between MD 101 and CN 108 in the presence of the two NATs. A process of opening, determining, and communicating new ports may both add complexity to the handover process and also impair performance of the handover. MD 101 should monitor IP:port 303 for MS 4 401, since the AN NAT 119 would generally otherwise drop packets on ports not previously opened by MD 101 and properly mapped by AN NAT 119. Alternative techniques to seek a different IP:port on AN NAT 119 than IP:port 304 for receipt of media destined to MD 101 at IP 301 may not be reliable, if AN NAT 119 is a symmetric NAT.

Voice activity detection (VAD) may preferably be disabled within MS 3 302 and MS 4 401 in order to keep IP:port 304 or IP:port 904 open and bound. Alternatively, VAD techniques that send silence descriptor packets more frequently than every few seconds could be implemented in order to keep the NAT ports open and bound. MD 101 may also wish to continue the media control channel with the CN 108 after MS 3 and MS 4 are established. The media control channel may also be useful as a feedback mechanism to each node that their transmitted media is properly received, before terminating either MS 1 or MS 2.

System 1000 illustrates the transmission of the media control channel as RTCP, although other techniques such as SRTCP or proprietary protocols could be implemented; or the media control channel could be omitted or embedded directly into the media stream, among other possibilities. MD 101 may establish a new media control channel RTCP stream 4 503 by sending RTCP reports from IP:port 501 to IP:port 1001 on CN NAT 903, which then are routed to CN 108 IP:port 1002, and during this process AN NAT 119 will create a new external port binding IP:port 1003 to the internal IP:port 501 assigned to MD 101. IP:port 1001 may be the same port on CN NAT 903 implemented to receive RTCP packets before handover, such as with the media control packets for MS 2 110.

Upon receipt of packets in RTCP stream 4 503 at CN 108 IP:port 1002, the corresponding node can observe the originating IP:port 1003 within the IP headers of the RTCP packet. Consequently, CN 108 may now begin transmitting RTCP reports regarding MS 3 302 to IP:port 1003 on AN NAT 119, thereby creating RTCP stream 3 504. AN NAT 119 forwards packets in RTCP stream 3 504 to IP:port 501 on MD 101 at IP 301. Thus, in order to effectively support a media control channel through AN NAT 119 and CN NAT 903, both CN 108 and MD 101 may implement the same IP:ports on their private IP addresses for sending and receiving media control packets, as shown by IP:port 501 and IP:port 1002.

11. FIG. 11

FIG. 11 is simplified tabular summary illustrating the source and destination IP addresses for media and media control packets transmitted and received during handover process according to an exemplary embodiment. The use of NATs at both nodes, such as alternate network NAT 119 and corresponding node NAT 903, increase the complexity of managing communications between MD 101 and CN 108. Each call control, media, or media control channel packet transmitted and received should have a source IP address and a destination IP address, as well as a source port number and a destination port number. Various example IP addresses and ports for the present invention are illustrated throughout FIGS. 1-9. The tabular summary in FIG. 11 illustrates example headers on packets within both the media and media control streams according to an exemplary embodiment illustrated in FIGS. 9 and 10.

The headers on a packet may be different as a packet routes (i) between MD 101 and AN NAT 119, (ii) between the external interfaces of the AN NAT 119 and CN NAT 903, and (iii) between CN NAT 903 and CN 108. In addition, multiple levels of NATs may connect either MD 101 or CN 108 to the Internet, and a single NAT is shown for each node in FIG. 11. If multiple NATs are deployed between a node and the public Internet 106, in general their combined function may be to act as a single logical NAT for most applications such as voice and media.

The packet headers for both media and a media control channel for all four media streams and media control channels in system 900 and system 1000 are illustrated in FIG. 11. An RTCP media control channel is illustrated in FIG. 11, although other media control packets could be inserted directly into the media streams, if the protocol implemented by the nodes support this type of logical channel. In addition, the media control channel could be omitted or partially omitted, such that RTCP or related techniques are implemented before handover, and then RTCP or the related techniques are not implemented after handover, thereby simplifying the handover process.

12. FIG. 12

Figure 12:
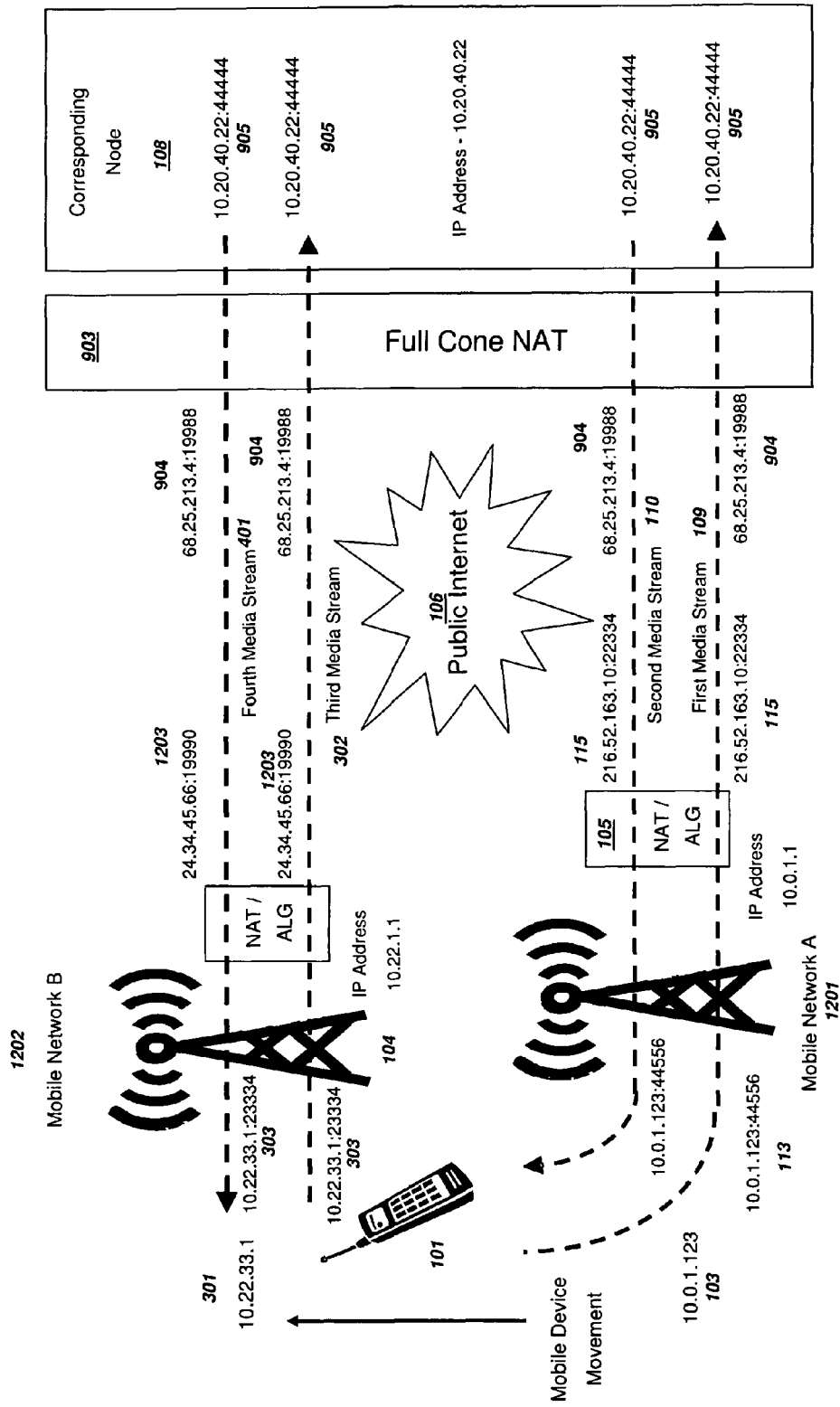
FIG. 12 is a graphical illustration of an exemplary system where the mobile device performs handover between two heterogeneous mobile networks according to an exemplary embodiment.

FIG. 12 is a graphical illustration of an exemplary system where the mobile device performs handover between two heterogeneous mobile networks, according to an exemplary embodiment. In addition to handover of active media sessions between a LAN and a WAN, as illustrated by systems 100, 200, 300, and 400 in FIGS. 1 through 4, the mobile device could also perform handover between two independent WANs utilizing the techniques of the present invention. The type of handover may be particularly beneficial to allow roaming between two separate service providers in a manner that allows active media sessions to remain both open and seamlessly transitioned for a user.

Handover for active mobile voice calls between roaming networks may not be supported on legacy networks such as GSM 2G, although idle handover may be supported. This lack of handover for active calls upon movement to a roaming network would likely result in dropped calls for a user. If the mobile networks provide connectivity to the Internet and IP addresses to a mobile device, the mobile device can perform handover in a manner that will keep the call active for the user by utilizing the techniques described herein.

According to system 1200 illustrated in FIG. 12, two separate mobile network operators, mobile network A 1201 and mobile network B 1202, each provide connectivity to the Internet to mobile devices. A user may receive service from mobile network A 1201, and MD 101 has established a media session with CN 108, consisting of MS 1 109 and MS 2 110. Media from MD 101 is transmitted using IP:port 113, representing the source IP address and port for packets transmitted by MD 101 at IP 103.

The mobile network A NAT 105 (MN A NAT 105) converts the source IP address and port for media packets transmitted by MD 101 to IP:port 115, representing the source IP address and port for media packets transmitted by MN A NAT 105. This conversion of IP:port 113 to IP:port 115 may take place with or without an application layer gateway (ALG) functionality within mobile network A NAT 105. If the media session between MD 101 and CN 108 is established using a protocol not understood by the ALG, or possibly through messages that are encrypted between MD 101 and CN 108, the ALG in MN A NAT 105 should not normally attempt to modify port numbers within the body of packets transmitted, and thus MN A NAT 105 would function as a regular NAT without ALG functionality. One example may be if MD 101 communicates with CN 108 according to the IAX2 protocol or the Jingle specification implemented by GoogleTalk®, while MN A NAT 105 operates as a SIP application layer gateway and NAT.

CN 108 may connect to the Internet via a full cone NAT router 903 as illustrated in FIG. 12, or alternatively CN 108 may have a publicly-routable IP address. Although IPv4 addresses are illustrated by system 1200 in FIG. 12, IPv6 addresses could be used. In addition, IPv6 addresses could be used in some elements in FIG. 12, such as through the public Internet 106 and on the mobile networks A and B, while other elements use IPv4, such as on the CN 108. In this case, the CN NAT router 903 may also translate between IPv4 and IPv6 packets.

The MD 101 may approach a second mobile network B due to user movement. Some possibilities for MD 101 being able to communicate via the second mobile network B include (i) the user having an account with mobile network B, (ii) mobile network A may have a roaming agreement with mobile network B, and (iii) mobile network B providing WAN wireless IP services for free in order to sell advertising to users, among other possibilities. Further, mobile network A and mobile network B may operate different underlying mobile networking technologies, such as mobile WiMax for mobile network A (802.16e, 802.20, or subsequent or related standards) and 3GPP LTE for mobile network B. Alternatively, mobile network B could be a municipal WiFi network, for example.

The media sessions illustrated by system 1200 in FIG. 12 can be managed by MD 101, and handover can occur between the different network technologies, if MD 101 has (i) the appropriate hardware interfaces to properly communicate with each network, such as the appropriate physical interfaces 201 and device drivers 202, and (ii) the user is authorized to access each network. As MD 101 acquires a sufficiently high signal-to-noise ratio from a base station 104 within mobile network B 1202, MD 101 can connect and authenticate with mobile network B and acquire IP 301, while continuing to communicate with CN 108 via IP 103. MD 101 may have gathered information that CN 108 is behind a full cone NAT when establishing the first media session consisting of MS 1 109 and MS 2 110.

Upon acquiring IP 301, MD 101 begins transmitting a third media stream 3 302 to IP:port 904 on CN NAT 903. This third media stream may represent a copy of MS 1 109, similar to "make before break" methodologies for mobile handover. Since CN NAT 903 may be a full cone NAT or firewall with packet filtering rules equivalent to a full cone NAT but without network address translation, packets from both MS 1 and MS 3 are forwarded to CN 108 IP:port 905. CN 108 preferably accepts both media streams and may combine the duplicate media in order to compensate for errors in any one individual stream.

CN 108, upon starting to receive MS 3 302, begins transmitting MS 4 401 back to MD 101 at IP 301. The destination IP:port for MS 4 401 is preferably IP:port 1203, which is observed by CN 108 as the source IP:port for MS 3 302. MD 101 can consequently both transmit and receive media with CN 108 on IP:port 303 at IP 301. Likewise, CN 108 can both transmit and receive media on IP:port 905.

Upon establishment of MS 3 and MS 4, a new media control channel can also be established, according to the techniques described in FIG. 5. The media control channel is optional, but establishment and use of the media control channel may be preferred since feedback on media quality received at each node may be helpful for determining that the handover is complete and successful. MD 101 can cease the transmission of MS 1 and also the associated media control channel RTCP stream, if present, upon the completion of handover. CN 108 can cease the transmission of MS 2 and also the associated media control channel RTCP stream, if present, upon the completion of handover. MD 101 at IP 301 can then continue to monitor for other available networks and potential preferred IP addresses for communication, and perform subsequent efficient handovers according to the systems and methods described herein.

13. FIG. 13

Figure 13:
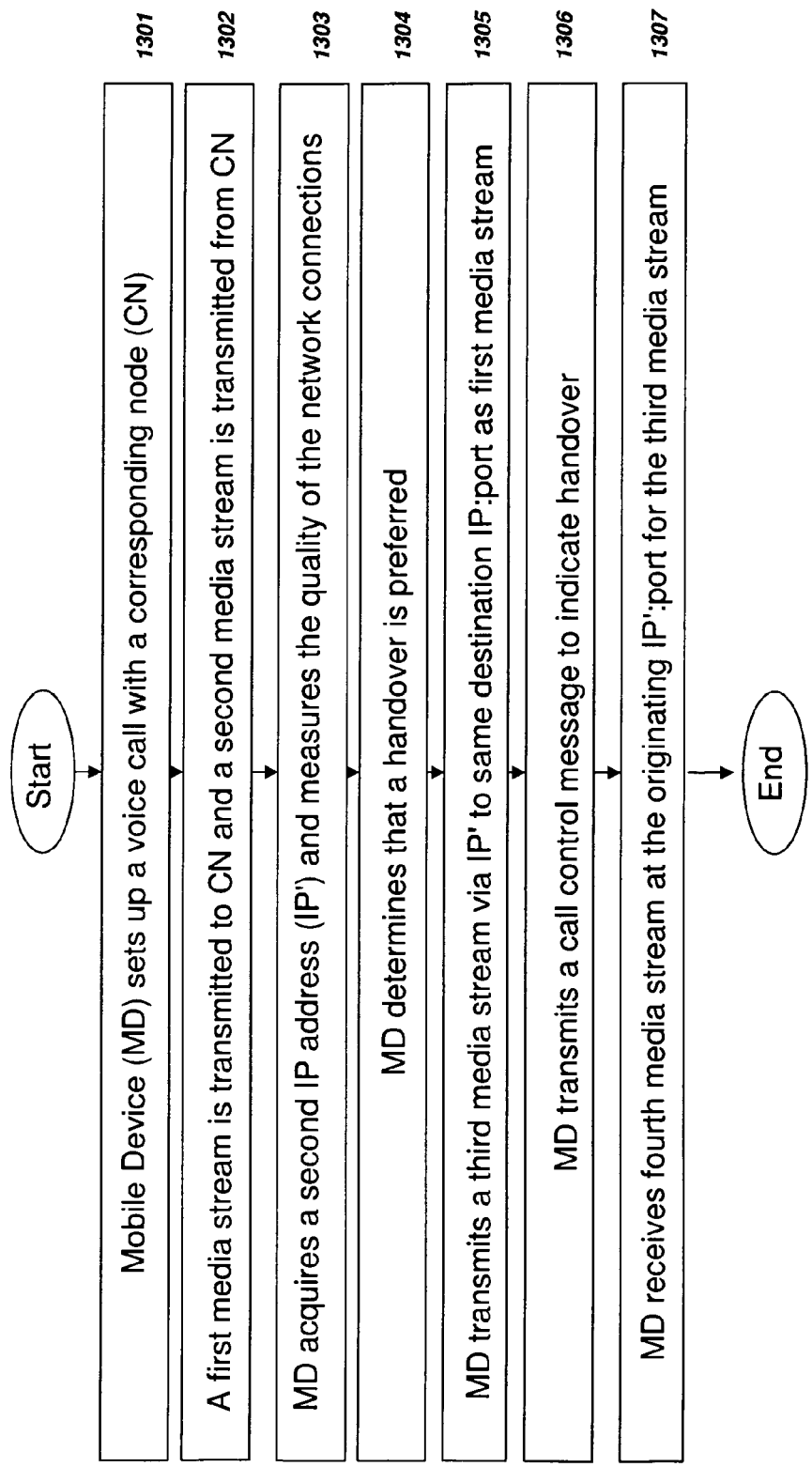
FIG. 13 is a flow chart illustrating exemplary steps for a mobile device to perform handover between heterogeneous IP networks.

FIG. 13 is a flow chart illustrating exemplary steps for a mobile device to perform handover between heterogeneous data networks. In Step 1301, MD 101 can establish a media session such as a voice call with a corresponding node 108. In Step 1302, MD 101 can transmit a first media stream 109 to the corresponding node 108 and receive a second media stream 110 from the corresponding node. In Step 1303, MD 101 can acquire a second IP address, IP 301, and can measure the quality of the network connections. In addition, MD 101 may measure the quality of the network connections before IP 301 is assigned to MD 101, such as properties related to the physical or data-link layer, including signal-to-noise ratio or bit errors. Measurements of IP network-level quality at IP 301, such as packet loss and jitter may require the assignment of IP 301 to MD 101. In Step 1304, MD 101 can determine that a handover is preferred according to one or more of the methods described herein, as examples.

In Step 1305, MD can begin the handover process by transmitting a third media stream 302 from IP 301 at IP:port 303 to a corresponding node. The corresponding node at step 1305 could also be a relay, as illustrated in FIG. 2b, which then forwards packets to the corresponding node 108 at IP:port 122. This is an example of where a corresponding node may also be a relay to a second corresponding node. If the corresponding node is not a relay, MD 101 could transmit MS 302 directly to CN 108 at IP:port 122 in Step 1305. In Step 1306, MD 101 can transmit a call-control message such as a SIP Re-Invite to CN 108, and other protocols or call-control messages could be used as well. Steps 1305 and 1306 could be interchanged. In Step 1307, MD 101 may receive a fourth MS 401 at the IP address and port implemented to originate the third media stream, which is illustrated as IP:port 303 in FIG. 4.

14. FIG. 14

Figure 14:
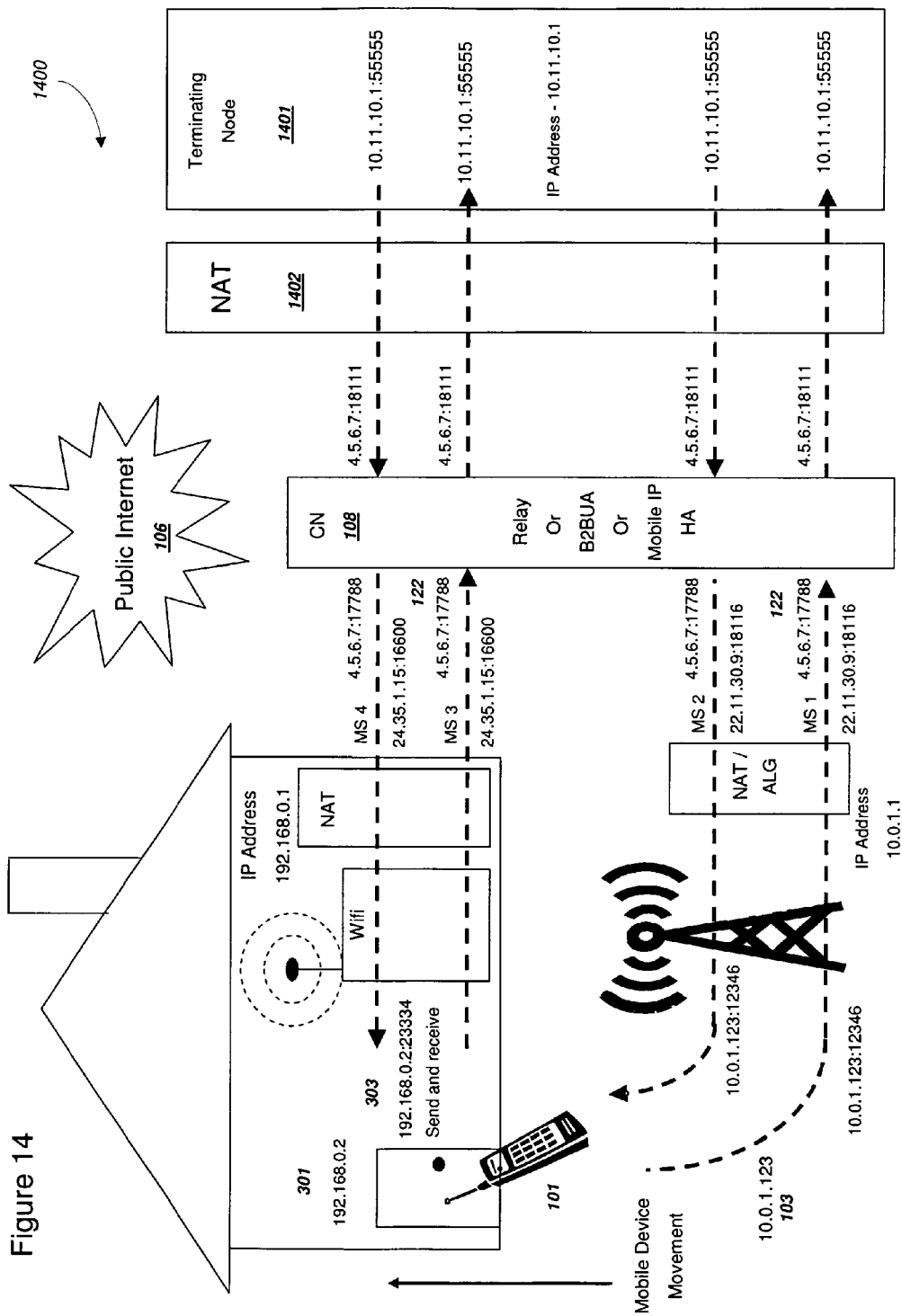
FIG. 14 is a graphical illustration of an exemplary system where the corresponding node performs as a relay to a terminating node, according to an exemplary embodiment.

FIG. 14 is a graphical illustration of an exemplary system where the corresponding node performs as a relay to a terminating node, according to an exemplary embodiment. One principle of media communications across the Internet is that the transmission of media directly between endpoints is generally preferred. Direct communication can both reduce delay and also avoid the cost of routing packets through an intermediate server, such as a Back-to-Back User Agent (B2BUA) in the SIP protocol, a home agent (HA) within the Mobile IP specification (IETF RFC 3344 and related standards), or a relay for the traversal of communication between endpoints behind NATs. In addition, direct communication between nodes may improve quality by reducing the probability of lost packets by decreasing the total number of router hops a packet may traverse between endpoints.

However, in some cases the direct routing of packets between endpoints may not be available, such as if both nodes connect to the public Internet 106 via symmetric NATs. If packets between a mobile device and a terminating node are routed through an intermediate server, the server may also function as a corresponding node for the mobile device. In this example case of the corresponding node bridging the communication between a mobile device and a terminating node, the encoding and decoding of media may not take place on the corresponding node, in order to reduce processing load on the corresponding node as well as preserve media quality, since multiple encodings and decodings of media can degrade quality. An intermediate server functioning as a corresponding node could also implement the techniques described in the present invention in order to both expedite and simplify the handover process.

In system 1400, CN 108 operates as an intermediate server between MD 101 and a terminating node (TN) 1401. CN 108 could be a device that communicates with both MD 101 and TN 1401, such as a Mobile IP Home Agent, SIP B2BUA, or a relay, among other possibilities. TN 1401 can be another mobile device, a personal computer operating a software program, or similar endpoint for the receipt and transmission of media across the Internet, among other possibilities. TN 1401 may have a private IP address and connect to the Internet via a NAT router 1402. NAT router 1402 can be different than NAT router 903, since NAT router 1402 may be of any standard type, including port-restricted cone, symmetric, or full cone. NAT router 903 may be restricted to the full cone type.

MD 101 can establish a media session with CN 108 by transmitting MS 1 and receiving MS 2. Communication between MD 101 and TN 1401 is obtained by CN 108 re-routing MS 1 to TN 1401 and also re-routing media from TN 1401 to MS 2. MD 101 could have previously handed over MS 1 and MS 2 to CN 108 in preparation for a second handover to IP 301. When MD 101 determines that communication with CN 108 is preferred via IP 301, MD 101 can initiate a handover. The handover can begin by MD 101 transmitting MS 3 to the same IP address and port implemented at the corresponding node for the receipt of MS 1, illustrated as IP:port 122. MS 3 and MS 1 may preferably represent essentially duplicate copies of the media, according to a "make before break" handover. The copies of the media do not have to be identical.

Upon receipt of duplicate media at IP:port 122, CN 108 may begin transmission of MS 4 without previously requiring a call-control message to be processed. A signal that MD 101 is performing handover can be communicated to CN 108 by (i) the receipt of MS 3 at IP:port 122, (ii) a call message via a call-control channel, (iii) a packet inserted within MS 1, or (iv) a change in the UDP checksums for packets within MS 1, among other options. Media packets do not have to be transmitted by UDP, and other transport protocols could be implemented as well, such as TCP.

CN 108 can transmit both MS 2 and MS 4 concurrently, also representing a "make before break" handover. MD 101 can monitor both IP 103 and IP 301 for the receipt of MS 2 and MS 4, respectively. A separate call-control message confirming handover can be processed by CN 108 after the transmission of MS 4 begins. The call-control message may need to traverse a call-control channel via a series of proxy servers as illustrated in FIG. 2b. By transmitting MS 4 before a call-control message is separately received at CN 108, the time required to implement handover of media can be reduced.

In FIG. 14, CN 108 may not need to make any changes in the communication with TN 1401 as MD 101 performs the handover. The duplicate media streams MS 1 and MS 3 can be filtered into a single media stream. In addition, CN 108 performs the action of bi-casting a single media stream received from TN 1401 to the two addresses IP 103 and IP 301. Consequently, TN 1401 need not be aware of the handover by MD 101.

CONCLUSION

Various exemplary embodiments have been described above. Those skilled in the art will understand, however, that changes and modifications may be made to those examples without departing from the scope of the claims.

What is claimed is:

1. A method comprising:
using a first Internet Protocol address and port (IP:port) number to receive at a device from a second IP:port number a first media control channel stream including quality information indicative of a quality of transmission of a first media stream being sent by the device through a network;
sending, by the device, from the first IP:port number to the second IP:port number a second media control channel stream including quality information indicative of a quality of transmission of a second media stream being received at the device through the network;
based on a network handover request, sending from a third IP:port number to the second IP:port number a third media control channel stream including quality information indicative of a quality of transmission of a third media stream being received at the device through an alternate network; and
using the third IP:port number to receive from the second IP:port number a fourth media control channel stream including quality information indicative of a quality of transmission of a fourth media stream being sent by the device through the alternate network.

2. The method of claim 1, wherein using the third IP:port number to receive the fourth media control channel stream comprises:
using the third IP:port number to receive the fourth media control channel stream before sending the third media control channel stream.

3. The method of claim 1, wherein sending the third media control channel stream comprises:
sending the third media control channel stream before the first second media control channel stream ends.

4. The method of claim 1, wherein the third media stream includes at least a portion of the second media stream, and wherein the fourth media stream includes at least a portion of the first media stream.

5. The method of claim 1, further comprising:
terminating, based on the fourth media control channel stream indicating that the quality of transmission of the fourth media stream meets a media transmission quality threshold, transmission of the first media stream.

6. The method of claim 1, further comprising:
making an adjustment, based on the fourth media control channel stream, to the fourth media stream, wherein making the adjustment comprises at least one of:
implementing a forward-error-correction (FEC) to the fourth media stream, and
modifying a codec associated with transmission of the fourth media stream.

7. The method of claim 1, further comprising:
determining, based on the fourth media control channel stream indicating that the quality of transmission of the fourth media stream meets a media transmission quality threshold, that network handover from the network to the alternate network is complete; and
terminating, in response to determining that the network handover is complete, transmission of the first media stream and receipt of the second media stream.

8. The method of claim 1, wherein receiving the first media control channel stream and the fourth media control channel stream, and sending the second media control channel stream and the third media control channel stream comprises:
receiving and sending respective media control channel streams using a Real-Time Control Protocol (RTCP) or a Secured Real-Time Control Protocol (SRTCP).

9. The method of claim 1, wherein the quality information indicative of the quality of transmission of a respective media stream comprises at least one of round-trip delay, packet loss, bit error, and jitter for the respective media stream.

10. The method of claim 1, further comprising:
initiating, based on the first media control channel stream indicating a degrading of communication through the network, the network handover request.

11. The method of claim 1, wherein sending the second media control channel stream comprises sending a periodic message transmitted within the first media stream, and wherein sending the third media control channel stream comprises sending a respective periodic message transmitted within the fourth media stream.

12. The method of claim 1, further comprising:
assigning, before sending the third media control channel stream, the third IP:port number for receipt of the fourth media control channel stream.

13. A non-transitory computer readable storage medium having stored therein instructions, that when executed by a computing device, cause the computing device to perform functions comprising:
using a first Internet Protocol address and port (IP:port) number to receive from a second IP:port number a first media control channel stream including quality information indicative of a quality of transmission of a first media stream being sent by the computing device through a network;
sending from the first IP:port number to the second IP:port number a second media control channel stream including quality information indicative of a quality of transmission of a second media stream being received at the computing device through the network;
based on a network handover request, sending from a third IP:port number to the second IP:port number a third media control channel stream including quality information indicative of a quality of transmission of a third media stream being received at the computing device through an alternate network, wherein the third media stream includes at least a portion of the second media stream; and
using the third IP:port number to receive from the second IP:port number a fourth media control channel stream including quality information indicative of a quality of transmission of a fourth media stream being sent by the computing device through the alternate network, wherein the fourth media stream includes at least a portion of the first media stream.

14. The non-transitory computer readable storage medium of claim 13, wherein the functions further comprise:
providing a port-binding packet, before sending the third media control channel stream, to assign the third IP:port number for receipt of the fourth media control channel stream.

15. The non-transitory computer readable storage medium of claim 13, wherein the functions further comprise:
determining, based on the fourth media control channel stream indicating that the quality of transmission of the fourth media stream meets a media transmission quality threshold, that network handover from the network to the alternate network is complete;
providing a call-control message to terminate transmission of the second media stream; and
terminating transmission of the first media stream.

16. The non-transitory computer readable storage medium of claim 13, wherein the functions further comprise:
making an adjustment, based on the fourth media control channel stream, to the fourth media stream.

17. A device comprising:
at least one processor; and
data storage comprising instructions that, when executed by the at least one processor, cause the device to perform functions comprising:
using a first Internet Protocol address and port (IP:port) number to receive from a second IP:port number a first media control channel stream including quality information indicative of a quality of transmission of a first media stream being sent by the device through a network;
sending from the first IP:port number, to the second IP:port number a second media control channel stream including quality information indicative of a quality of transmission of a second media stream being received at the device through the network;
based on a network handover request, sending from a third IP:port number to the second IP:port number a third media control channel stream including quality information indicative of a quality of transmission of a third media stream being received at the device through an alternate network; and
using the third IP:port number to receive from the second IP:port number a fourth media control channel stream including quality information indicative of a quality of transmission of a fourth media stream being sent by the device through the alternate network.

18. The device of claim 17, wherein the third media stream includes at least a portion of the second media stream, and wherein the fourth media stream includes at least a portion of the first media stream.

19. The device of claim 17, wherein the function of using the third IP:port number to receive the fourth media control channel stream comprises using the third IP:port number to receive the fourth media control channel stream before sending the third media control channel stream,
and wherein the function of sending the third media control channel stream comprises sending the third media control channel stream before the first second media control channel stream ends.

20. The device of claim 17, wherein the functions further comprise:
terminating, based on the fourth media control channel stream, transmission of the first media stream and receipt of the second media stream.

\* \* \* \* \*